United States Patent
Gotou et al.

(10) Patent No.: US 11,001,075 B2
(45) Date of Patent: May 11, 2021

(54) PRINTING METHOD, PRINTING DEVICE, AND PRINTED MATTER

(71) Applicants: Hiroshi Gotou, Kanagawa (JP); Tomohiro Hirade, Kanagawa (JP)

(72) Inventors: Hiroshi Gotou, Kanagawa (JP); Tomohiro Hirade, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 53 days.

(21) Appl. No.: 16/515,321

(22) Filed: Jul. 18, 2019

(65) Prior Publication Data

US 2020/0023648 A1 Jan. 23, 2020

(30) Foreign Application Priority Data

Jul. 19, 2018 (JP) .............................. JP2018-135493

(51) Int. Cl.
| | | |
|---|---|---|
| *B41J 2/21* | (2006.01) | |
| *B41J 2/145* | (2006.01) | |
| *C09D 11/40* | (2014.01) | |
| *C09D 11/322* | (2014.01) | |

(52) U.S. Cl.
CPC ............. *B41J 2/2117* (2013.01); *B41J 2/145* (2013.01); *C09D 11/322* (2013.01); *C09D 11/40* (2013.01)

(58) Field of Classification Search
CPC ... B41J 2/2117; B41J 2/01; B41J 2/145; B41J 3/4078; C09D 11/322; C09D 11/40
See application file for complete search history.

(56) References Cited

U.S. PATENT DOCUMENTS

| | | | | |
|---|---|---|---|---|
| 4,880,465 | A * | 11/1989 | Loria | C09D 11/30 106/31.13 |
| 2006/0207448 | A1* | 9/2006 | Fresener | B41J 3/4078 101/115 |
| 2007/0104899 | A1* | 5/2007 | Pearl | B41J 11/002 428/32.24 |
| 2011/0184108 | A1* | 7/2011 | Okuda | C09D 11/322 524/377 |
| 2012/0019579 | A1* | 1/2012 | Usuda | B41J 2/2117 347/12 |
| 2014/0354740 | A1* | 12/2014 | Smet | C09D 11/322 347/85 |
| 2015/0329723 | A1* | 11/2015 | Wachi | C09D 11/322 106/31.9 |
| 2017/0267889 | A1 | 9/2017 | Katsuragi | |
| 2017/0355867 | A1* | 12/2017 | Kasperchik | C09D 11/107 |
| 2018/0298219 | A1* | 10/2018 | Loccufier | C09D 11/38 |
| 2019/0284414 | A1* | 9/2019 | Bruinsma | C09D 11/40 |

FOREIGN PATENT DOCUMENTS

| | | |
|---|---|---|
| JP | 2013-212637 | 10/2013 |
| JP | 2013-212653 | 10/2013 |
| JP | 2014-083740 | 5/2014 |
| JP | 2014-114529 | 6/2014 |
| JP | 2015-047711 | 3/2015 |
| JP | 2016-530987 | 10/2016 |
| JP | 2017-171874 | 9/2017 |
| JP | 2017-209797 | 11/2017 |
| WO | WO2014/209944 A1 | 12/2014 |

* cited by examiner

*Primary Examiner* — John Zimmermann
(74) *Attorney, Agent, or Firm* — Oblon, McClelland, Maier & Neustadt, L.L.P.

(57) ABSTRACT

A printing method includes discharging a first white ink comprising a first white pigment and a second white ink containing a second white pigment by a discharging head, wherein the following relationship is satisfied: $|R_A - R_B| \geq 0.5$, where $R_A$ represents a refractive index of the first white pigment and $R_B$ represents a refractive index of the second white pigment.

15 Claims, 6 Drawing Sheets

PRINTING METHOD, PRINTING DEVICE, AND PRINTED MATTER

CROSS-REFERENCE TO RELATED APPLICATIONS

This patent application is based on and claims priority pursuant to 35 U.S.C. § 119 to Japanese Patent Application No. 2018-135493, filed on Jul. 19, 2018, in the Japan Patent Office, the entire disclosure of which is hereby incorporated by reference herein.

BACKGROUND

Technical Field

The present disclosure relates to a printing method, a printing device, and printed matter.

Description of the Related Art

Since inkjet printers are relatively quiet, enjoy low running costs, and are capable of easily printing color images, they are now widely used at home as an output device of digital signals. In recent years, such inkjet technologies have been appealing in business fields of, for example, display, posters, and signboards in addition to home use.

However, recording media for industrial use are not limited to paper, but can include anything from paper to transparent film to colored articles. To demonstrate white on such recording media or color it with color ink, it is necessary to conceal transparency of a recording medium or sufficiently conceal the color of the recording medium with ink. For this reason, white ink is used to make a transparent recording medium or a colored recording medium white.

In addition, when color ink is used, in order to use the same color ink for use in typical images, the surface of a recording medium is covered with white ink as a backdrop for the color ink to enhance coloring.

In such a white ink, titanium oxide, zinc oxide, barium sulfate, and hollow silica are used as inorganic pigments having a high refractive index to easily demonstrate a high degree of whiteness. In addition, hollow resin particles are used as an organic pigment.

SUMMARY

According to embodiments of the present disclosure, provided is a printing method which includes discharging a first white ink comprising a first white pigment and a second white ink containing a second white pigment by a discharging head, wherein the following relationship is satisfied: $|R_A - R_B| \geq 0.5$, where $R_A$ represents a refractive index of the first white pigment and $R_B$ represents a refractive index of the second white pigment.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
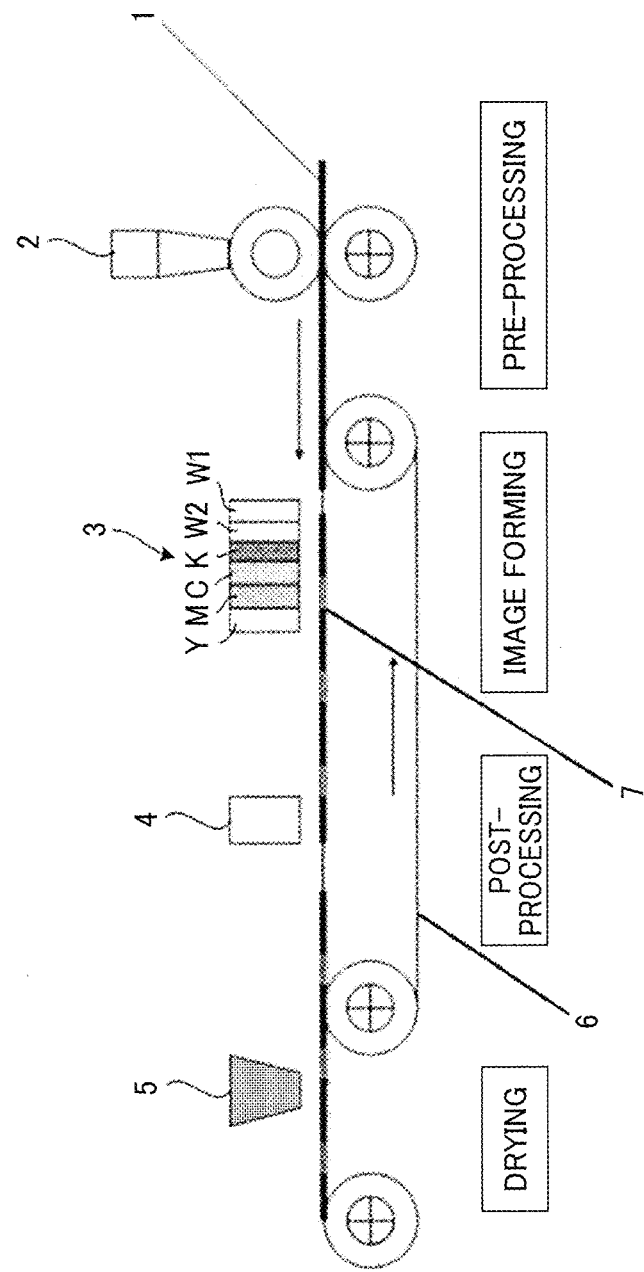
FIG. 1 is a schematic diagram illustrating an example of the printing device of the present disclosure for use in the printing method of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Within the context of the present disclosure, if a first layer is stated to be "overlaid" on, or "overlying" a second layer, the first layer may be in direct contact with a portion or all of the second layer, or there may be one or more intervening layers between the first and second layer, with the second layer being closer to the substrate than the first layer.

For example, a liquid discharging device has been proposed which is capable of forming a suitable image when forming a first image (background layer) by a first image forming operation and forming a second image (color image) on the first image by a second image forming operation. Also, in the same color area, white ink is superimposed to form a white image.

In addition, a printing device has been proposed which includes a head that jets a first white ink containing a pigment having a first particle diameter and a second white ink containing a pigment having a second particle diameter and a controller that controls the head to jet the second white ink onto the first white ink after jetting and landing the first white ink onto a recording medium, wherein the second particle diameter is smaller than the first particle diameter.

According to the present disclosure, a printing method is provided which is capable of obtaining printed matter having a high degree of whiteness and excellent abrasion resistance.

Printing Method and Printing Device

The printing method includes discharging a first white ink containing a first white pigment ink and a second white ink containing a second white pigment by a discharging head and other optional processes, wherein the following relationship is satisfied:

$|R_A-R_B| \geq 0.5$, where $R_A$ represents a refractive index of the first white pigment and $R_B$ represents a refractive index of the second white pigment.

The printing device of the present disclosure includes a discharging device configured to discharge a first white ink containing a first white pigment and a second white ink containing a second white pigment by a discharging head and other optional devices, wherein the following relationship is satisfied: $|R_A-R_B| \geq 0.5$, where $R_A$ represents a refractive index of the first white pigment and $R_B$ represents a refractive index of the second white pigment.

The printing method of the present disclosure can be suitably executed by the printing device of the present disclosure, the ink discharging process can be executed by the ink discharging device, and the other optional processes can be executed by the other optional devices.

The printing method and the printing device of the present disclosure were made based on the knowledge that, when a single white pigment is used in a liquid discharging device capable of forming an image when forming a first image (background layer) by a first image forming operation and forming a second image (color image) on the first image by a second image forming operation, which is proposed in, for example, JP-2017-209797-A, Hunter's brightness has a limit so that it is likely to fail to obtain a target value more than expected. Also, if the whiteness in the same color area is low, increasing the discharging amount of the ink to increase Hunter's brightness causes white ink to overflow from and smear a recording medium and dividing the first image forming operation into several operations to avoid such overflow of the white ink out of a recording medium takes an excessively long time.

Furthermore, the printing method and the printing device of the present disclosure were made based on the knowledge that, although two kinds of white pigments are used in a printing device which includes a head that jets a first white ink containing a pigment having a first particle diameter and a second white ink containing a pigment having a second particle diameter and a controller that controls the head to jet the second white ink onto the first white ink after jetting and landing the first white ink onto a recording medium, wherein the second particle diameter is smaller than the first particle diameter proposed in, for example, JP-2013-212637-A, without a suitable relationship between the refractive indices of the two kinds of white pigments, it is not possible to obtain printed matter having a high level of whiteness and excellent abrasion resistance.

The printing method and the printing device of the present disclosure are suitable for inkjet recording on transparent and colored recording media. Due to overlapping printing by a discharging head having multiple nozzle arrays discharging a first white ink and a second white ink having different refractive indices through different nozzle arrays, the first white pigment and the second white pigment having different refractive indices are laminated, so that printed images have high whiteness degree.

In the present disclosure, the refractive index of the first white pigment and the refractive index of the second white pigment are different. Moreover, the difference in absolute value between the refractive index $R_A$ of the first white pigment and the refractive index $R_B$ of the second white pigment is 0.5 or more, more preferably 1.0 or more, and higher in absolute value, and more preferably 1.2 or more. When the refractive index difference ($R_A-R_B$) in absolute value is 0.5 or more, printed matter having a high Hunter whiteness and excellent abrasion resistance can be obtained.

The printing method and the printing device of the present disclosure are preferably used for solid printing on a background in terms of whiteness degree.

Ink Discharging Process and Ink Discharging Device

Ink is discharged in the ink discharging process using a discharging head, which is executed by an ink discharging device.

The discharging head preferably has a plurality of nozzle arrays in terms of high-speed printing and control of the ink discharging amount.

As the ink discharging device, a method of discharging an ink using a thermal type or piezo type recording head is preferable. In the present disclosure, it is more preferable that a container filled with the ink is mounted onto an inkjet recording device and the ink is discharged using a piezo type recording head to record on a recording medium.

A redispersion device can be used to reduce aggregation or settling in the nozzles of the recording head and to obtain good printed matter. The redispersion device mechanically disperses a white pigment in a dispersion medium. Examples are, but are not limited to a mechanism for stirring the ink in a container filled with the ink, a shaking mechanism, a vibration applying mechanism, and a mechanism for circulating the ink.

As the ink, the first white ink containing the first white pigment, the second white ink containing the second white pigment, and an optional non-white ink are used.

First and Second White Ink

The first white ink contains the first white pigment, preferably an organic solvent, a binder polymer, and a surfactant, and other optional components.

The second white ink contains the second white pigment, preferably an organic solvent, a binder polymer, and a surfactant, and other optional components.

It is preferable that, using a discharging head having a plurality of nozzle arrays, the first white ink and the second white ink are discharged from different nozzle arrays of the plurality of nozzle arrays in terms of high-speed printing and control of ink discharging amount. In addition, the whiteness of the printed matter can be increased by discharging the first white ink and the second white ink from different nozzle arrays in an overlapping manner.

First and Second White Pigments

The first and second white pigments are not particularly limited as long as the relationship of the above refractive index is satisfied. For example, inorganic white pigments and organic white pigments can be used.

Examples of the inorganic white pigment include, but are not limited to, rutile-type titanium oxide, which is most popularly used, and surface-treated rutile-type titanium oxide having an oriented and aggregated strip-like particle form. The refractive index of typical titanium oxide is from 2.30 to 2.75.

Other inorganic white pigments include, but are not limited to, zinc oxide (refractive index: from 1.90 to 2.00), barium sulfate (refractive index: from 1.60 to 1.70), calcium carbonate (refractive index: from 1.49 to 1.69), aluminum hydroxide (refractive index: 1.57), and hollow silica (refractive index: from 1.20 to 1.25).

Examples of the organic white pigment include, but are not limited to, styrene or styrene-acrylic hollow polymer particles (refractive index: from 1.20 to 1.25).

It is preferable that one of the first white pigment and the second white pigment contains a hollow polymer particle having a refractive index of from 1.2 to 1.3 or a hollow silica particle having a refractive index of from 1.2 to 1.3 in terms of securing heat resistance of the ink layer.

It is preferable that one of the first white pigment and the second white pigment contains a hollow polymer particle or a hollow silica particle having a refractive index of from 1.2 to 1.3 and the other of the first white pigment and the second white pigment contains titanium oxide having a refractive index of from 2.30 to 2.75 in terms of securing heat resistance and abrasion resistance of an ink layer.

The refractive index of the first and second white pigments can be measured by an Abbe refractometer Model AR-1 TSORID, manufactured by ATAGO CO., LTD.

Cumulative 50 percent volume particle diameter ($D_{50}$) of the inorganic white pigment is preferably 100 nm or more and more preferably 150 nm or more. In addition, cumulative 50 percent volume particle diameter of the inorganic white pigment ($D_{50}$) is preferably 400 nm or less and more preferably 350 nm or less in terms of storage stability.

Cumulative 50 percent volume particle diameter ($D_{50}$) of the organic white pigment is preferably 200 nm or more and more preferably 300 nm or more in terms of whiteness degree. In addition, cumulative 50 percent volume particle diameter ($D_{50}$) of the organic white pigment is preferably 1,000 nm or less and more preferably 900 nm or less in terms of storage stability.

Cumulative 50 percent volume particle diameter ($D_{50}$) of the inorganic white pigment and the organic white pigment can be measured using, for example, Microtrac UPA-EX 150 (manufactured by Microtrac Inc.).

The organic white pigment is preferably hollow polymer particles and the hollow polymer particles preferably have a hollow ratio of 40 percent by volume or more, more preferably 50 percent by volume or more in terms of the degree of whiteness.

The hollow ratio of the hollow polymer particle is calculated by the following relationship 1.

Hollow ratio (percent)={(volume of void)/(volume of entire particles)}×100     Relationship 1

White Pigment Dispersion

It is possible to mix the first white pigment and the second white pigment with materials such as water and an organic solvent to obtain a white ink. It is also possible to obtain a white pigment dispersion by mixing the first white pigment and the second white pigment with water, a dispersant, etc., and thereafter mix the white pigment dispersion with materials such as water and an organic solvent to obtain a white ink.

The white pigment dispersion is obtained by mixing and dispersing water, a white pigment, a pigment dispersant, and other optional components and thereafter controlling the particle size. It is preferable to use a dispersing device for dispersion.

The method of preparing a white pigment dispersion has no particular limit and can be suitably selected to suit to a particular application. In terms of re-dispersibility, it is preferable to mix a white pigment dispersion, a polymer dispersant containing an acid group, a solvent, and an optional additive to obtain a mixture and thereafter dispersing the mixture by a dispersing device for adjustment.

The mixture may be prepared in a single dispersion. However, in terms of obtaining a uniform dispersion, the mixture may be preliminarily dispersed before the dispersion.

In order to disperse the inorganic pigment, an acid group-containing polymer dispersant is preferably used. As another dispersant, for example, an anionic surfactant, a cationic surfactant, an amphoteric surfactant, a nonionic surfactant, and a polymer dispersant can be selected depending on the type of the white pigment.

Also, a nonionic surfactant (RT-100, manufactured by TAKEMOTO OIL & FAT CO., LTD.) and a formalin condensate of naphthalene sodium sulfonate are suitable as the dispersant. Those dispersants can be used alone or in combination.

Acid Group-Containing Polymer Dispersant

The acid group-containing polymer dispersant to disperse the first white pigment and second white pigment disperses them by adsorption or utilizing charge repulsion or steric hindrance to maintain dispersion stability.

As the acid group containing polymer dispersant, it is suitable to use a polymer dispersant obtained by neutralizing an anionic water-soluble polymer having a glass transition temperature of from 0 to 80 degrees C., an acid value of from 100 to 300 mgKOH/g, and a weight average molecular weight of from 5,000 to 50,000 with a basic compound.

As the anionic water-soluble polymer, a copolymer is preferable which is obtained by selecting one or more kinds of carboxylic acid-containing unsaturated monomer (including an acid anhydride group-containing unsaturated monomer which provides a carboxyl group at ring opening) having an acid group such as acrylic acid, methacrylic acid, itaconic acid, maleic acid, maleic anhydride, maleic acid monoalkyl ester, citraconic acid, citraconic acid anhydride, and citraconic acid monoalkyl ester, with one or more kinds of unsaturated monomer selected from the group consisting of styrene monomers such as styrene, α-methylstyrene, and vinyl toluene, aralkyl methacrylates or acrylates such as benzyl methacrylate and benzyl acrylate, and alkyl methacrylates or acrylates (preferably having an alkyl group having 1 to 18 carbon atoms) such as methyl methacrylate, butyl methacrylate, 2-ethylhexyl methacrylate, stearyl methacrylate, lauryl methacrylate, methyl acrylate, butyl acrylate, 2-ethylhexyl acrylate, stearyl acrylate, and lauryl acrylate, in such a manner that the glass transition temperature is from 0 to 80 degrees C. and the acid value is from 100 to 300 mgKOH/g, and reacting them in such a manner that the weight average molecular weight is from 5,000 to 50,000.

More preferably, the arboxylic acid-containing unsaturated monomer and the unsaturated monomer are selected in such a manner that the monomer component having an aromatic ring such as styrene-based monomer accounts for 0 to 50 percent by mass of the entire monomer component and reacted in such a manner that the glass transition temperature is from 0 to 60 degrees C., the acid value is from 130 to 240 mgKOH/g, and the weight average molecular weight is from 8,000 to 30,000.

In addition, a block copolymer is preferable which has a structure unit derived from an acrylic acid or methacrylic acid-based monomer and a structure unit derived from a methacrylate containing an alkyl group.

When the acid value of the anionic water-soluble polymer is less than 100 mgKOH/g, the solubility of a resin in the aqueous medium may be reduced. To the contrary, when the acid value exceeds 300 mg KOH/g, the water resistance of media-printed printed matter may be reduced.

In addition, when the glass transition temperature of the anionic water-soluble polymer is less than 0 degrees C., fusion between pigment dispersed particles is likely to occur, thereby degrading storage stability and discharging stability. To the contrary, when the glass transition temperature exceeds 80 degrees C., the fixability of the obtained printed matter may be lowered.

When the weight average molecular weight of the anionic water-soluble polymer is less than 5,000, the pigment dispersion stability may be reduced. To the contrary, when the weight average molecular weight exceeds 50,000, the pigment dispersibility in an aqueous medium may be reduced.

Examples of the copolymer include, but are not limited to, a (meth)acrylic acid alkyl ester-(meth)acrylic acid copolymer, a styrene-(meth)acrylic acid copolymer, a styrene-(meth)acrylic acid-(meth)acrylic acid alkyl ester copolymer, a styrene-maleic acid-(meth)acrylic acid alkyl ester copolymer, a styrene-maleic acid half ester copolymer, a styrene-maleic acid half ester-(meth)acrylic acid alkyl ester copolymer, and a styrene-(meth)acrylic acid-(meth)acrylic acid alkyl ester-benzyl(meth)acrylate copolymer. These can be used alone or in combination.

Specific examples of the basic compound include, but are not limited to, alkali metal hydroxides such as sodium hydroxide and potassium hydroxide, and organic basic compounds such as triethylamine, monoethanolamine, triethanolamine, and triethylenediamine. These can be used alone or in combination.

Commercially available products can be used as the acidic group containing polymer dispersant.

Specific examples include, but are not limited to, DISPERBYK-102, DISPERBYK-108, DISPERBYK-110, DISPERBYK-111, DISPERBYK-180, DISPERBYK-180, DISPERBYK-182, DISPERBYK-185, and DISPERBYK-2015 (all are available from BYK Japan KK.). These can be used alone or in combination.

The content of the acid group-containing polymer dispersant is preferably 10 to 40 parts by mass, and more preferably from 15 to 30 part by mass to 100 parts by mass of rutile type titanium oxide to obtain good dispersibility and discharging stability.

The dispersing device is not particularly limited and can be suitably selected to suit to a particular application. Examples include, but are not limited to, an ultrasonic dispersing machine, an attritor, a media type dispersing machine such as a sand mill using a ball mill, a glass bead, a zirconia bead etc., a kneading and mixing device such as a kneader, and a colloid mill.

The temperature during the dispersion is preferably 10 degrees C. or higher, more preferably 15 degrees C. or higher, and furthermore preferably 18 degrees C. or higher in terms of lowering the viscosity of the first and second white pigment dispersions. The temperature during the dispersion is preferably 35 degrees C. or lower and 30 degrees C. or lower.

The dispersion time is not particularly limited and can be suitably selected depending on a dispersing device. To sufficiently refine the first and second white pigments, the dispersion time is preferably one hour or more and more preferably 100 hours or more.

In terms of concealing property, the proportion of the first or second white pigment in the entire white ink is preferably 5 percent or more and more preferably 10 percent by mass or more. In terms of ink discharging property, the proportion of the first or second white pigment in the entire white ink is preferably 25 percent or less and more preferably 20 percent by mass or less.

The ink composition is common in the first or second white ink except for the first or second white ink and will be collectively described below.

Organic Solvent

An organic solvent is added to obtain a first or second white ink having excellent dispersion stability and discharging stability of the first or second white pigment.

In order to make a white ink wettable to a non-permeable substrate, it is preferable to contain an amide compound represented by the following Chemical structure I as an organic solvent, and at least one of an alkane diol and a glycol ether.

Chemical structure I

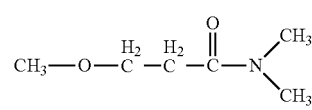

The amide compound represented by Chemical structure I has a high boiling point of 216 degrees C., a high equilibrium moisture content of 39.2 present by mass in an environment of 23 degrees C. and a relative humidity of 80 percent, and furthermore an extremely low liquid viscosity of 1.48 mPa·S at 25 degrees C. Furthermore, since the amide compound is easily dissolved in an organic solvent and water, viscosity of the white ink can be lowered, which is very preferable as an organic solvent for the white ink.

Alkane diol and glycol ether used for the white ink for use in the present disclosure are described below.

In terms of securing the dispersion stability and discharging stability of the white pigment, it is preferable to contain alkanediol and glycol ether having a boiling point of from 90 degrees C. to lower than 250 degrees C.

Alkanediol Having Boiling Point of 90 to Lower Than 250 Degrees C.

The alkane diol having a boiling point of from 90 to lower than 250 degrees C. includes a polyhydric alcohol.

Specific examples include, but are not limited to, 1,2-alkanediols such as ethylene glycol (boiling point of 197 degrees C.), propylene glycol (boiling point of 188 degrees C.), 1,2-butanediol (boiling point of 193 degrees C.), 1,2-pentanediol (boiling point of 206 degrees C.), and 1,2-hexane diol (boiling point of 223 degrees C.), diethylene glycol (boiling point of 245 degrees C.), polyethylene glycol, dipropylene glycol (boiling point of 232 degrees C.), 1,3-propanediol (boiling point of 210 degrees C.), 1,3-butanediol (boiling point of 208 degrees C.), 1,4-butanediol (boiling point of 230 degrees C.), 3-methyl-1,3-butanediol (boiling point of 203 degrees C.), 1,5-pentanediol (boiling point 242 degrees C.), 2-methyl-2,4-pentanediol (boiling point of 196 degrees C.), 1,2,6-hexanetriol (boiling point of 178 degrees C.), 1,2,4-butanetriol (boiling point of 190 degrees C.), 1,2,3-butanetriol (boiling point of 175 degrees C.), and petriol (boiling point of 216 degrees C.). These can be used alone or in combination.

Of these, from the same point of view as described above, at least one of an alkanediol having 2 to 6 carbon atoms such as propylene glycol, diethylene glycol, and 1,2-hexane diol and a polypropylene glycol having a molecular weight of from 500 to 1,000 are preferable. At least one of 1,2-alkanediol having 3 to 4 carbon atoms such as propylene glycol and diethylene glycol and the above-mentioned polypropylene glycol are more preferable.

Glycol Ether

Examples of the glycol ether include, but are not limited to, alkylene glycol monoalkyl ether, and alkylene glycol dialkyl ether. Of these, alkylene glycol monoalkyl ether is preferable from the same point of view as described above.

The number of carbon atoms in the alkyl group of alkylene glycol monoalkyl ether is preferably 1 or more, more preferably 2 or more, and furthermore preferably 3 or more. The number of carbon atoms in the alkyl group of alkylene glycol monoalkyl ether is preferably 6 or less and more preferably 4 or less.

The alkyl group of the alkylene glycol monoalkyl ether may be linear or branched.

Specific examples of the alkylene glycol monoalkyl ether include, but are not limited to, ethylene glycol ethyl ether (boiling point of 136 degrees C.), ethylene glycol isopropyl ether (boiling point of 144 degrees C.), ethylene glycol propyl ether (boiling point of 151 degrees C.), ethylene glycol butyl ether (boiling point of 171 degrees C.), diethylene glycol methyl ether (boiling point of 194 degrees C.), diethylene glycol ethyl ether (boiling point of 202 degrees C.), diethylene glycol isopropyl ether (boiling point of 207 degrees C.), diethylene glycol isobutyl ether (boiling point of 220 degrees C.), diethylene glycol butyl ether (boiling point of 230 degrees C.), triethylene glycol methyl ether (boiling point of 248 degrees C.), dipropylene glycol butyl ether (boiling point of 231 degrees C.), dipropylene glycol methylether (boiling point of 189 degrees C.), and tripropylene glycol methyl ether (boiling point of 243 degrees C.). These can be used alone or in combination.

Of these, at least one of ethylene glycol isopropyl ether, ethylene glycol propyl ether, diethylene glycol methyl ether, diethylene glycol isopropyl ether, diethylene glycol isobutyl ether, and diethylene glycol butyl ether is preferable. Moreover, at least one of ethylene glycol isopropyl ether, diethylene glycol isopropyl ether, and diethylene glycol isobutyl ether is preferable ether is more preferable.

Other Organic Solvent

As the other organic solvents, examples include, but are not limited to, other alcohols usually compounded in aqueous ink, alkyl ethers and glycol ethers of the alcohols, nitrogen-containing heterocyclic compounds such as N-methyl-2-pyrrolidone, amides, amines, and sulfur-containing compounds.

For example, 1,6-hexanediol (boiling point of 250 degrees C.), triethylene glycol (boiling point of 285 degrees C.), tripropylene glycol (boiling point of 273 degrees C.), polypropylene glycol (boiling point of 250 degrees C. or higher), glycerin (boiling point of 290 degrees C.), etc. can be used in combination with a compound having a boiling point of lower than 250 degrees C.

The proportion of the organic solvent in the entire white ink is preferably from 10 to 90 percent by mass and more preferably from 20 to 80 percent by mass in terms of wettability onto non-permeable substrate and discharging stability.

Binder Polymer

The binder polymer preferably contains at least one of an acrylic resin, a styrene resin, a styrene-acrylic resin, and a urethane-based resin in terms of fixability to a substrate.

The binder polymer may be used as a homopolymer or as a composite polymer using a copolymer, and any of single phase structure type, core shell type, and power feed type emulsion may be used.

As the binder polymer, a polymer having a hydrophilic group and a self-dispersing property and a polymer to which dispersing property is imparted by a surfactant or a polymer having a hydrophilic group while the polymer itself does not have dispersibility can be used. For example, emulsions of polymer particles obtained by emulsification polymerization or suspension polymerization of ionomers or unsaturated monomers of a polyester resin or polyurethane resin are most suitable. In the case of emulsification polymerization of an unsaturated monomer, since a resin emulsion is obtained by reaction in water to which an unsaturated monomer, a polymerization initiator, a surfactant, a chain transfer agent, a chelate agent, a pH regulator, etc. are added, it is easy to obtain a binder polymer and also change the polymer constitution. Therefore, target properties can be easily obtained.

Of these binder polymers, acrylic resins and polyurethane resins are preferred in terms of adhesion to a substrate.

Acrylic Resin

Specific examples of the acrylic resin include, but are not limited to, unsaturated carboxylic acids, mono-functional or poly-functional (meth)acrylic acid ester monomers, (meth)acrylic amide monomers, aromatic vinyl monomers, vinyl cyano compound monomers, vinyl monomers, allylated compound monomers, olefin monomers, dien monomers, and oligomers having unsaturated carbon. These can be used alone or in combination. When these monomers are used in combination, the polymer properties can be flexibly reformed. The polymer properties can be reformed utilizing polymerization reaction and graft reaction using an oligomer type polymerization initiator.

Specific examples of the unsaturated carboxylic acids include, but are not limited to, acrylic acid, methacrylic acid, itaconic acid, fumaric acid, and maleic acid.

Specific examples of the mono-functional (meth)acrylic acid ester monomers include, but are not limited to, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethyl aminoethyl methacrylate, methacryloxy ethyltrimethyl ammonium salts, 3-methcryloxy propyl trimethoxy silane, methyl acrylate, ethylacrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethyl aminoethyl acrylate, and acryloxy ethyl trimethyl ammonium salts. These can be used alone or in combination.

Specific examples of polyfunctional (meth)acrylic acid ester monomers include, but are not limited to, ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane diol dimethacrylate, neopentyl glycol dimethacrylate, dipropylene glycol dimethacrylate, polypropylene glycol dimethacrylate, polybutylene glycol dimethacrylate, 2,2'-bis(4-methacryloxy diethoxyphenyl)propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexane diol diacrylate, neopentyl glycol diacrylate, 1,9-nonane diol diacrylate, polypropylene glycol diacrylate, 2,2'-bis(4-acryloxy propyloxyphenyl)propane, 2,2'-bis(4-acryloxy diethoxyphenyl) propane trimethylol propane triacrylate, trimethylol ethane triacrylate, tetramethylol methane triacrylate, ditrimethylol tetraacryalte, tetramethylol methane tetraacrylate, pentaerythritol tetraacrylate, and dipentaerythritol hexaacrylate. These can be used alone or in combination.

Specific examples of the (meth)acrylic amide monomers include, but are not limited to, acrylic amides, methacrylic amides, N,N-dimethyl acrylic amides, methylene bis acrylic amides, and 2-acrylic amide-2-methyl propane sulfonates.

Specific examples of the aromatic vinyl monomers include, but are not limited to, styrene, α-methylstyrene, vinyl toluene, 4-t-butyl styrene, chlorostyrene, vinyl anisole, vinyl naphthalene, and divinyl benzene.

Specific examples of the vinyl cyano compound monomers include, but are not limited to, acrylonitrile, and methacrylonitrile.

Specific examples of the vinyl monomers include, but are not limited to, vinyl acetate, vinylidene chloride, vinyl chloride, vinyl ether, vinyl ketone, vinyl pyrolidone, vinyl sulfonic acid and its salts, vinyl trimethoxy silane, and vinyl triethoxy silane.

Specific examples of the allylated compound monomers include, but are not limited to, allyl sulfonic acid and its salts, allyl amine, allyl chloride, diallyl amine, and diallyl dimethyl ammonium salts.

Specific examples of the olefin monomers include, but are not limited to, ethylene and propylene.

Specific examples of the dien monomers include, but are not limited to, butadiene and chloroprene.

Specific examples of the oligomers having unsaturated carbon include, but are not limited to, styrene oligomers having a methacryloyl group, styrene-acrylonitrile oligomers having a methacryloyl group, methyl methacrylate oligomers having a methacryloyl group, dimethyl siloxane oligomers having a methacryloyl group, and polyester oligomers having an acryloyl group.

The acid value of the acrylic resin is preferably from 10 to 300 mgKOH/g and from 20 to 200 mgKOH/g.

The acid value is the amount of mg of KOH necessary to neutralize 1 g of a resin.

The weight average molecular weight (Mw) of an acrylic resin is preferably from 1,000 to 100,000 and more preferably from 2,000 to 50,000.

The weight average molecular weight (Mw) can be measured by, for example, gel permeation chromatography (GPC).

The glass transition temperature (Tg as measured according to JIS K6900 format) of the acrylic resin is preferably from −50 to 200 degrees C. and more preferably from −50 to 100 degrees C.

As the acrylic resin, commercially available products can be used. Specific examples include, but are not limited to, Grandoll PP-1000EF, Boncoat 40-418EF, Boncoat CE-6270, Boncoat CG-6150, Boncoat CG-8400, Boncoat CG-8680, Boncoat DV-961, Boncoat EM-401, and Boncoat PE-200 (manufactured by DIC Corporation), Polysol AM-200, Polysol M-17N, and Polysol AM-610 (manufactured by Showa Denko K.K.), X-436, QE-1042, HE-1335, RE-1075, JE-1056, JE-1113, KE-1148, and XP8812 (manufactured by SEIKO PMC CORPORATION). These can be used alone or in combination.

Polyurethane Resin

The polyurethane resin is not particularly limited and can be suitably selected to suit to a particular application. Water-soluble or water-dispersible polyurethane resin obtained by reacting a diisocyanate compound and a diol compound is suitable.

Specific examples of the diisocyanate compound include, but are not limited to, alicyclic diisocyanat compounds such as hexamethylene diisocyanate, 2,2,4-trimethyl hexamethylene diisocyanate, hydrogeneated xylilene diisocyanate, 1,4-cyclohexane diisocyanate, and 4,4-dicyclohexyl methane diisocyanate, aromatic aliphatic diisocyanate compounds such as xylilene diisocyanates and tetramethyl xylilene diisocyanates, aromatic diisocyanate compounds such as toluylene diisocyanate and phenyl methane diisocyanate, and modified products (carbodiimides, uretdione, and uretonimine containing modified products) of these diisocyanates.

Specific examples of the diol compound include, but are not limited to, diol compounds obtained by (co) polymerizing alkylene oxides such as ethylene oxide and propylene oxide, and heterocyclic ethers such as tetrahydrofuran.

Specific examples of the diol compound include, but are not limited to, polyether diols such as polyethylene glycol, polypropylene glycol, polytetramethylene ether glycol, and polyhexamethylene ether glycol, polyester diols such as polyethylene adipate, polybutylene adipate, polyneopentyl adipate, poly-3-methylpentyl adipate, polyethylene/butylene adipate, and polyneopentyl/hexyl adipate, polylactone diols such as polycaprolactone diol, and polycarbonate diol. These can be used alone or in combination. Of these, polyether diol, polyester diol, and polycarbonate diol are preferable.

In addition to the above, diol compounds having an acidic group such as a carboxylic acid group and a sulfonic acid group can also be used. Specific examples include, but are not limited to, dimethylol acetic acid, dimethylol propionic acid, and dimethylol butyric acid. These can be used alone or in combination. Of these, dimethylol propionic acid is preferable.

In the synthesis of the polyurethane resin, low molecular weight polyhydroxy compounds may be added.

Examples of the low molecular weight polyhydroxy compounds include, but are not limited to, glycols, adducts of low molar alkylene oxide, and trihydric alcohols such as glycerin, trimethylol ethane, and trimethylol propane or adducts of low molar alkylene oxide thereof, which are used as raw materials for polyester diols.

The thus-obtained urethane prepolymer can be elongated after or during neutralizing an acid group derived from dimethylolalkanoic acid or di(tri)amine.

Specific examples of polyamines used for chain elongation include, but are not limited to, hexamethylene diamine, isophorone diamine, hydrazine, and piperazine. These can be used alone or in combination.

Preferred examples of the polyurethane resin include, but are not limited to, a polyether-based polyurethane resin, a polyester-based polyurethane resin, and a polycarbonate-based urethane resin obtained by using a polyether diol, a polyester diol, and a polycarbonate diol as the diol compound.

The form of the polyurethane resin is not particularly limited and can be suitably selected to suit to a particular application. For example, emulsion type, for example, a self-emulsifying emulsion and a self-stabilizing type can be used.

In particular, of the above-mentioned compounds, it is preferable to use a diol having an acid group such as a carboxylic acid and sulfonic acid group and adding a polyhydroxy compound having a low molecular weight. Also, a urethane resin into which an acid group is introduced is preferable, in particular, a urethane resin having a carboxyl group is preferable.

Furthermore, it is preferable to cross-link these functional groups such as carboxyl groups by a cross-linking treatment described later in terms of enhancing gloss and abrasion resistance.

It is also possible to use a neutralized polyurethane resin. Specific examples of the base used for neutralization include, but are not limited to, alkylamines such as butylamine and triethylamine, alkanolamines such as monoethanolamine, diethanolamine, and triethanolamine, and inorganic bases such as morpholine, ammonia, and sodium hydroxide.

The acid value of the polyurethane resin is preferably from 10 to 300 mgKOH/g and more preferably from 20 to 100 mgKOH/g.

The acid value is the amount of mg of KOH necessary to neutralize 1 g of a resin.

The weight average molecular weight (Mw) of a polyurethane resin is preferably from 100 to 200,000 and more preferably from 1,000 to 50,000.

The weight average molecular weight (Mw) can be measured by, for example, gel permeation chromatography (GPC).

The glass transition temperature (Tg as measured according to JIS K6900 format) of the polyurethane resin is preferably from −50 to 200 degrees C. and more preferably from −50 to 100 degrees C.

Polyurethane resins are available on the market. Specific examples include, but are not limited to, NeoRez R-960, NeoRez R-989, NeoRez R-9320, and NeoRad NR-440 (all manufactured by Kushimoto Chemical Co., Ltd.), Hydran AP-30, Hydran APX-601, Hydran SP-510, and Hydran SP-97 (all manufactured by DIC Corporation), Superflex 130, Superflex 150, Superflex 150HS, Superflex 170, Superflex 210, Superflex 300, Superflex 420, Superflex 420HS, Superflex 470, Superflex 740, Superflex 820, and Superflex 830HS, Superflex 860, and Superflex 870 (all manufactured by Daiichi Kogyo Seiyaku Co., Ltd.), UCOAT UX-310, UCOAT UX-320, UCOAT UX-300, UCOAT UR-700, UCOAT UX-8100, UCOAT UX-2510, UCOAT UX-340, and UCOAT UWS-145, PERMARIN UA-150, UCOAT UA-200, PERMARINT UA-350, PERMARIN UA-368T, and PERMARIN UA-3945 (all are manufactured by Sanyo Chemical Industries, Ltd.), Takelac W-5030, Takerac Take W-6010, Takelac W-6020, Takelac W-6061, Takelac W-605, Takelac W-5661, and Takelac W-6110 (all manufactured by Mitsui Chemicals, Inc.). These can be used alone or in combination.

The cumulative 50 percent volume particle diameter ($D_{50}$) of the binder polymer is related to viscosity of a liquid dispersion. If the compositions are the same, viscosity of the same solid portion increases as the particle diameter decreases. To avoid obtaining ink having an excessively high viscosity, the cumulative 50 percent volume particle diameter ($D_{50}$) of the binder polymer is preferably 50 nm or more. In addition, particles having a cumulative 50 percent volume particle diameter ($D_{50}$) as large as several tens μm are larger than the size of the nozzle orifice of an inkjet head. Therefore, particles of that size are not suitably usable. When large particles are present in the ink, the discharging property of the ink deteriorates, even if the particles are smaller than the nozzle orifice. Therefore, the cumulative 50 percent volume particle diameter ($D_{50}$) is preferably 200 nm or less and more preferably 150 nm or less not to degrade the ink discharging property.

The cumulative 50 percent volume particle diameter ($D_{50}$) of the binder polymer can be measured using, for example, Microtrac UPA-EX 150 (manufactured by Microtrac Inc.).

The binder polymer to be added to the white ink is preferably from 0.1 to 3 times of the solid content of the white pigment dispersion.

The proportion of the binder polymer in the entire ink is preferably from 0.5 to 20 percent by mass and more preferably from 1 to 15 percent by mass in terms of fixing property onto a substrate.

Surfactant

The white ink for use in the present disclosure preferably contains a silicone-based surfactant, an acetylene glycol-based surfactant, and a fluorochemical surfactant in terms of the ink wettability to a non-permeable substrate.

The silicone-based surfactant is not particularly limited and can be suitably selected to suit to a particular application. To reduce an increase in ink viscosity and improve continuous dischargeability to obtain good printed matter, polyether modified silicone surfactants are particularly preferable.

Polyether-Modified Silicone-Based Surfactant

Inclusion of the polyether-modified siloxane compound as the surfactant makes ink not easy to be wet on the ink repelling film of the nozzle plate of an ink head in spite that the ink is wet on a non-permeable substrate. Therefore, defective discharging caused by ink attachment to the nozzle can be prevented so that discharging stability is improved.

The polyether-modified siloxane compound is a surfactant having low dynamic surface tension, good permeability, and good leveling property, without impairing dispersion stability regardless of the type of pigment dispersion and the combination of the organic solvents.

Polyether-modified siloxane compounds are available on the market. Specific examples include, but are not limited to, 71ADDITIVE, 74ADDITIVE, 57ADDITIVE, 8029ADDITIVE, 8054ADDITIVE, 8211ADDITIVE, 8019ADDITIVE, 8526ADDITIVE, FZ-2123, and FZ-2191 (all manufactured by Dow Corning Toray Co., Ltd.), TSF4440, TSF4441, TSF4445, TSF4446, TSF4450, TSF4452, and TSF4460 (all manufactured by Momentive Performance Materials Inc.), SILFACE SAG002, SILFACE SAG003, SILFACE SAG005, SILFACE SAG503A, SILFACE SAG008, and SILFACE SJM003 (all manufactured by Nisshin Chemical Co., Ltd.), TEGO Wet KL245, TEGO Wet 250, TEGO Wet 260, TEGO Wet 265, TEGO Wet 270, and TEGO Wet 280 (all manufactured by Evonik Industries AG), and BYK-345, BYK-347, BYK-348, BYK-375, and BYK-377 (all manufactured by BYK Japan KK.). These can be used alone or in combination.

Of these, TEGO Wet 270, manufactured by Evonik Industries AG and SILFACE SAG503A, manufactured by Nisshin Chemical Co., Ltd.) are preferable.

Acetylene Glycol-Based Surfactant

As a surfactant other than the polyether modified silicone surfactant, an acetylene glycol-based surfactant is preferable in terms of the wettability to a non-permeable substrate.

An acetylene glycol-based surfactant has an acetylene bond, is a very stable glycol in terms of a molecular structure, has a small molecular weight, significantly reduces surface tension, and is effective to wet an ink to a substrate.

Acetylene glycol-based surfactant is available on the market.

Specific examples include, but are not limited to, Surfynol 104, Surfynol 104E, Surfynol 420, Surfynol 440, Surfynol 465, Surfynol SE, Surfy Norle SEF, Surfynol DF110D, Surfynol DF37, Surfynol DF58, Surfynol DF75, Surfynol CT136, Surfynol 61, Olfin PD-002W, Olfin E1004, and Olfin E1010 (all manufactured by Nissin Chemical co., ltd.)

Fluorochemical Surfactant

A fluorochemical surfactant is suitable as the surfactant that wets a non-permeable substrate.

Since the fluorochemical surfactant has a structure having a fluorine-containing group in the molecule, it has effects of significantly reducing the surface tension and wetting the ink to the substrate.

The fluorochemical surfactant is commercially available on the market. Specific examples include, but are not limited to, Futergent 100, Futergent 150, Futergent 212M, Futergent 400SW, and Futergent 251 (all of which are manufactured by Neos Co., Ltd.), Capstone FS-3100, Capstone FS-10, Capstone FS-30, Capstone FS-60, and Capstone FS-65 (all of which are manufactured by The Chemours Company), Unidyne NS-9013 and Unidyne DNS-403N (all are manufactured by DAIKIN INDUSTRIES, LTD.), Surfron S-111, S-112, S-113, S-121, S-131, S-132, S-141, and S-145 (all are manufactured by ASAHI GLASS CO., LTD.); Fullard FC-93, FC-95, FC-98, FC-129, FC-135, FC-170C, FC-430, and FC-431 (all are manufactured by SUMITOMO 3M Limited); Megaface F-470, F-1405, and F-474 (all are manufactured by DIC Corporation) and Polyfox PF-151N (all of which are manufactured by OMNOVA Solutions).

The proportion of the surfactant in the entire white ink is preferably from 0.001 to 5.000 percent by mass and more preferably from 0.5 to 3.0 percent by mass. When the proportion is from 0.001 to 5.000 percent by mass, ink is not easily wet on the ink repelling film of the nozzle plate of an ink head in spite that the ink is wet to a non-permeating substrate. Therefore, defective discharging caused by ink attachment to the nozzle plate can be prevented and discharging stability is improved.

In the present disclosure, other surfactants can be used in combination with silicone-based surfactants, acetylene glycol-based surfactants, and fluorochemical surfactants. Of these, nonionic surfactants are preferred in terms of the applicability of the ink.

Specific examples of the nonionic surfactant include, but are not limited to, (1) alkyl ethers, alkenylether, alkynyl ether, or aryl ether of poloxyalkylene in which ethylene oxide, propylene oxide, or butylene oxide (hereinafter collectively referred to as alkylene oxide) is added to saturated or unsaturated linear or branched higher alcohol, polyhydric alcohol, or aromatic alcohol having 8 to 22 carbon atoms, (2) esters of higher alcohols having saturated or unsaturated linear or branched hydrocarbon group having 8 to 22 carbon atoms and polyvalent aliphatic acids, (3) polyoxyalkylene aliphatic amines having a linear or branched alkyl or alkenyl group having 8 to 20 carbon atoms, and (4) ester compounds of higher aliphatic acids having 8 to 22 carbon atoms and polyhydric alcohols or adducts thereof with alkylene oxide.

Other Components

As the other components, various additives such as water, a defoaming agent, a preservatives and fungicides, a corrosion inhibitor, and a pH regulator can be optionally added.

Water

The proportion of water in the white ink is not particularly limited and can be suitably selected to suit to a particular application. In terms of drying property and discharging reliability of the white ink, the proportion is preferably from 10 to 90 percent by mass and more preferably from 20 to 60 percent by mass.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not lower than 7. Specific examples include, but are not limited to, amines such as diethanol amine and triethanol amine.

The white ink of the present disclosure can be prepared by dissolving or mixing and dispersing the above-mentioned components in a solvent followed by optional stirring and mixing.

As for the stirring and mixing, a stirrer using a common stirring blade, a magnetic stirrer, a static mixer using a liquid flow, an ultrasonic homomixer, and a mixer type disperser of high speed rotation can be used.

Ink Properties

Properties of the white ink are not particularly limited and can be suitably selected to suit to a particular application. For example, viscosity, surface tension, and pH are preferably in the following ranges.

Viscosity of the white ink at 25 degrees C. is preferably from 4 to 20 mPa·s and more preferably from 5 to 15 mPa·s to improve print density and text quality and obtain good discharging property.

Viscosity can be measured by, for example, a rotatory viscometer (RE-80L, manufactured by TOKI SANGYO CO., LTD.). The measuring conditions are as follows:

Standard cone rotor (1° 34'×R24)

Sample liquid amount: 1.2 mL

Rotational frequency: 50 rotations per minute (rpm)

25 degrees C.

Measuring time: three minutes

The static surface tension of the white ink is preferably 35 mN/m or less and more preferably 32 mN/m or less at 25 degrees C. in terms that the ink is suitably leveled on a recording medium and the drying time of the ink is shortened.

Third Ink

The third ink is other than the first and second white inks, and is preferably at least one of black ink, cyan ink, magenta ink, and yellow ink.

The black ink, cyan ink, magenta ink, and yellow ink are the same as the white ink except that a coloring material is used instead of the white pigment in the first and second white inks. Therefore, the detailed description is omitted.

Coloring Material

The coloring material has no particular limit. For example, pigments and dyes are usable.

As the pigment, inorganic pigments or organic pigments can be used. These can be used alone or in combination. In addition, it is possible to use a mixed crystal as the pigment.

As the pigments, for example, black pigments, yellow pigments, magenta pigments, cyan pigments, green pigments, orange pigments, and gloss pigments and metallic pigments of gold, silver, etc., can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.T. Pigment Orange 5, 13, 16, 17, 36, 43, and 51; C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material is preferably from 0.1 to 15.0 percent by mass and more preferably from 1 to 10 percent by mass to the total content of the ink in terms of enhancing image density, fixability, and discharging stability.

Pre-Processing Fluid

The pre-processing liquid includes a flocculant, an organic solvent, water, and optional materials such as a surfactant, a defoaming agent, a pH regulator, a preservatives and fungicides, and a corrosion inhibitor.

The organic solvent, the surfactant, the defoaming agent, the pH regulator, the preservatives and fungicides, and the corrosion inhibitor can be the same material as those for use in the ink. Also, other material for use in known processing fluid can be used.

The type of the flocculant is not particularly limited. For example, water-soluble cationic polymers, acids, and multi-valent metal salts are suitable.

Post-Processing Fluid

The post-processing fluid has no particular limit. It is preferable that the post-processing fluid can form a transparent layer. Material such as organic solvents, water, resins, surfactants, defoaming agents, pH regulators, preservatives and fungicides, corrosion inhibitors, etc. is suitably selected based on a necessity basis and mixed to obtain the post-processing fluid. The post-processing fluid can be applied to the entire recording area formed on a recording medium or only the area on which an ink image is formed.

Substrate

The substrate is not particularly limited and can be suitably selected to suit to a particular application. For example, a non-permeable substrate is preferable.

The non-permeable substrate has a surface with low moisture permeability and low absorbency and includes a material having myriad of hollow spaces inside but not open to the outside. To be more quantitative, the substrate has a water-absorption amount of 10 mL/m$^2$ or less between the start of the contact and 30 msec$^{1/2}$ later according to Bristow method.

Specific examples of the non-permeable substrate include, but are not limited to, corrugated paper, paperboard, color cast coated paper, and resin film. Of these, color cast coated paper and resin film are preferable.

As the color cast coated paper, specific examples include, but are not limited to, Color Gloria Black <275 g/m$^2$>, Color Gloria Black <310 g/m$^2$>, Color Gloria Black A<326 g/m$^2$> (All are manufactured by Gojo Paper MFG. CO. Ltd.); Esprit color blue <320 g/m$^2$>, Esprit color green <320 g/m$^2$> (All are manufactured by NIPPON PAPER INDUSTRIES CO., LTD.); Lumina color black <270 g/m$^2$>, Lumina color black <310 g/m$^2$>, Lumina card black <330 g/m$^2$> (All are manufactured by Oji F-Tex Co., Ltd.); LK color black <350 g/m$^2$>, LK color black <430 g/m$^2$>, LK color blue <350 g/m$^2$>, and LK color blue <430 g/m$^2$> (All are manufactured by MITSUBISHI PAPER MILLS LIMITED).

Specific examples of the resin film include, but are not limited to, a vinyl chloride resin film, a polyethylene terephthalate (PET) film, a polypropylene film, a polyethylene film, a polycarbonate film, and a transparent synthetic resin film. These films may be biaxially stretched films, uniaxially stretched films, or non-stretched films.

The resin film is more preferably one or more selected from the group consisting of a polyester film and a stretched polypropylene film and furthermore preferably a polyester film such as polyethylene terephthalate which has been subjected to surface treatment such as corona discharging or a biaxially stretched polypropylene film.

The transparent synthetic resin film is available on the market. Specific examples include, but are not limited to, Lumirror T60 (polyethylene terephthalate, manufactured by Toray Industries, Inc.), FE2001 (corona-treated polyethylene terephthalate, manufactured by Futamura Chemical Corporation), FOS #60 (Corona-treated biaxially oriented polypropylene film, manufactured by Futamura Chemical Co., Ltd.), PVC80B P (polyvinyl chloride, manufactured by Lintec Corporation), KINATH KEE70CA (polyethylene, manufactured by Lintec Corporation), Yupo SG90 PATI (polypropylene, manufactured by Lintec Corporation), and BONYL™ RX (nylon, manufactured by KOHJIN Film & Chemicals Co., Ltd.).

Ink Accommodating Unit

The printing device of the present disclosure preferably includes an ink accommodating unit to accommodate ink.

The ink accommodating unit preferably includes a first ink accommodating unit to accommodate the first white ink and a second ink accommodating unit to accommodate the second white ink.

Furthermore, it is preferable to have a third ink accommodating unit to accommodate the third ink.

Other Processes and Other Devices

The other optional processes are not particularly limited and can be suitably selected to suit to a particular application. Examples are a drying process and a control process.

The other optional devices are not particularly limited and can be suitably selected to suit to a particular application. Examples are a drying device and a control device.

For example, the drying device heats the printing surface and the back surface of a recording medium.

Specific examples include, but are not limited to, an infrared heater, a hot air heater, a heating roller. These can be used alone or in combination.

Drying can be conducted before, in the middle of, or after printing.

Printed Matter

In an embodiment, the printed matter of the present disclosure includes a substrate, a first white ink layer formed on the substrate with a first white ink containing a first white pigment, and a second white ink layer formed on the substrate with a second white ink containing a second white pigment, wherein the first white pigment contains a hollow polymer particle having a refractive index of from 1.2 to 1.3 or a hollow silica particle having a refractive index of from 1.2 to 1.3, wherein the second white pigment contains titanium oxide having a refractive index of from 2.30 to 2.75.

According to the printed matter of this embodiment, printed matter having high whiteness and excellent abrasion resistance and heat resistance can be obtained.

In another embodiment, the printed matter of the present disclosure includes a substrate, a first white ink layer formed on the substrate with a first white ink containing a first white pigment, and a second white ink layer formed on the substrate with a second white ink containing a second white pigment, wherein the first white pigment contains a hollow polymer particle having a refractive index of from 1.2 to 1.3 or a hollow silica particle having a refractive index of from 1.2 to 1.3, wherein the following relationship is satisfied: $|R_A - R_B| \geq 0.5$, where $R_A$ represents a refractive index of the first white pigment and $R_B$ represents a refractive index of the second white pigment.

According to the printed matter of this embodiment, printed matter having high whiteness and excellent abrasion resistance and heat resistance can be obtained.

Furthermore, it is preferable to have a third ink layer formed of a third ink other than the white ink.

The printed matter preferably includes the first white ink layer formed on the substrate, the second white ink layer formed on the first white ink layer, and the third ink layer formed on the second white ink layer.

The substrate is preferably a non-permeable substrate.

Also, the printed matter may include a layer formed with a pre-processing liquid.

Figure 4A:
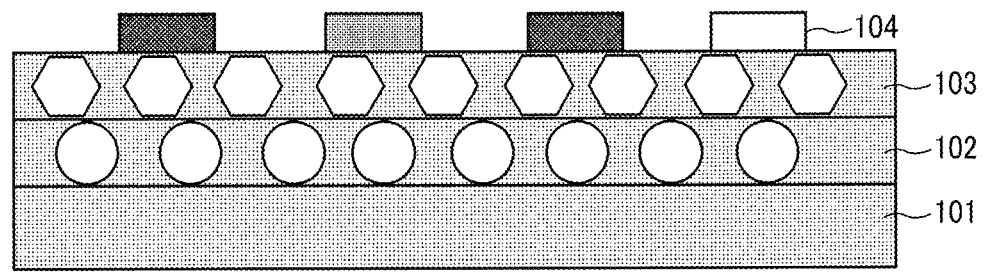
FIG. 4A is a schematic diagram illustrating an example of the printed matter of the present disclosure.
Figure 4B:
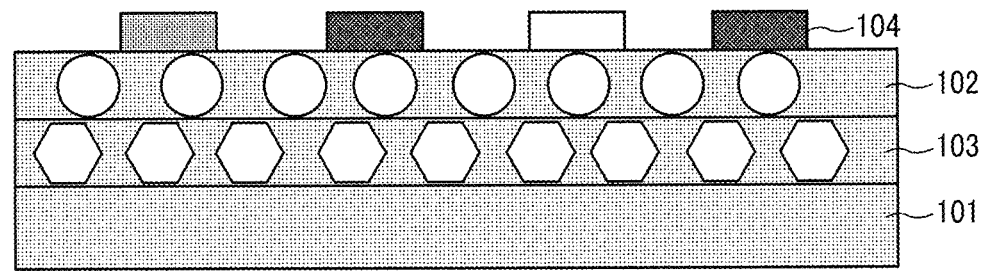
FIG. 4B is a schematic diagram illustrating another example of the printed matter of the present disclosure.

FIGS. 4A and 4B are schematic diagrams illustrating examples of the printed matter of the present disclosure.

FIG. 4A is a diagram illustrating an example of the printed matter having a first white ink layer 102, a second white ink layer 103, and a third ink layer 104 in this order on a substrate 101.

FIG. 4B is a diagram illustrating an example of the printed matter having the first white ink layer 103, the second white ink layer 102, and the third ink layer 104 in this order on the substrate 101.

The usage of the ink for use in the present disclosure is not particularly limited and can be suitably selected to suit to a particular application. For example, the ink can be used for printed matter, a paint, a coating material, and foundation. The ink can be used to form two-dimensional texts and images and furthermore a three-dimensional solid object (solid fabrication object or solid freeform fabrication object) as a material for 3D modeling.

Any known device can be used as the solid freeform fabrication device to fabricate a solid fabrication object with no particular limit. For example, the device is formed of a container, a supplying device, and a discharging device, a drier, etc. of ink. The solid fabrication object includes an object manufactured by repeated ink coating. In addition, the solid fabrication object includes a mold-processed product manufactured by processing a structure having a substrate such as a recording medium to which the ink is applied. The mold-processed product is manufactured from recorded matter or a structure having a sheet-like form, film-like form, etc., by, for example, heating drawing or punching. The mold-processed product is suitably used for articles which are molded after surface-decorating. Examples are gauges or operation panels of vehicles, office machines, electric and electronic devices, cameras, etc.

Image forming, recording, printing, print, etc. in the present disclosure represent the same meaning.

Also, recording media, media, substrates in the present disclosure have the same meaning.

Here, embodiments of the printing device of the present disclosure will be described in detail with reference to the accompanying drawings.

In each drawing, the same components may be denoted by the same reference numerals (symbols) and redundant description may be omitted. In addition, the present disclosure is not limited to the number, position, forms, etc. of the embodiments described above and those can be suitably selected to suit to enforcement of the present disclosure.

First Embodiment

FIG. 1 is a schematic diagram illustrating an example of the printing device according to the first embodiment. The printing device illustrated in FIG. 1 includes a pre-processing liquid application device 2 to apply a pre-processing liquid, an ink discharging head 3 to discharge black ink (K), cyan ink (C), magenta ink (M), yellow ink (Y), the first white ink (W1), and the second white ink (W2), a post-processing liquid application device 4 to apply the post-processing liquid, a drying device 5, and a conveyor belt 6 to convey a substrate 1.

Figure 3:
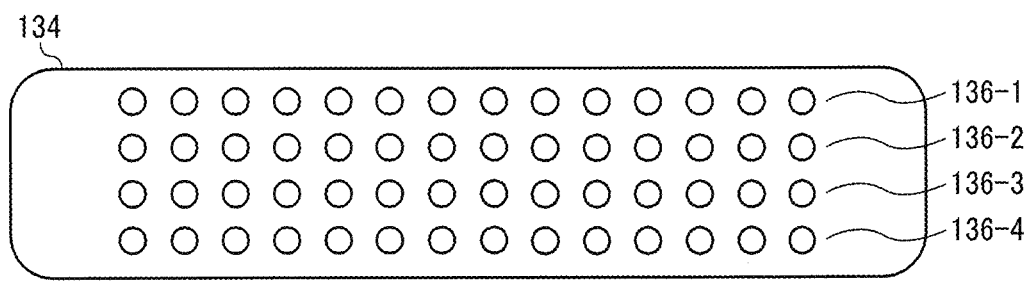
FIG. 3 is a schematic diagram illustrating an example of a discharging head including multiple nozzle arrays.

The printing device has a discharging head 134 having a plurality of nozzle arrays as illustrated in FIG. 3. Although, in FIG. 3, the discharging head 134 has four nozzle arrays 136 (136-1, 136-2, 136-3, and 136-4), the number of the nozzle arrays is not limited. A discharging head is provided for each color to form one head unit, and each of two discharging heads of the discharging heads constituting the head unit may be assigned to discharge the first white ink (W1) and the second white ink (W2). In addition, it is also good to provide a discharging head including six arrays to discharge ink droplets of each color of yellow (Y), cyan (C), magenta (M), black (Bk), the first white ink (W1), and the second white ink (W2). Furthermore, it is also suitable to provide a head unit including a discharging head having four nozzle arrays to discharge ink droplets of yellow (Y), cyan (C), magenta (M), and black (Bk), and a discharging head having two nozzle arrays to discharge ink droplets of the first white ink (W1) and the second white ink (W2).

First, a pre-processing liquid is applied onto the substrate 1 by the pre-processing liquid application device 2 during a pre-processing step. Subsequently, an image of YMCK is formed on the image formed by superposing the first white ink image and the second white ink image in an image forming portion 7 under the ink discharging head 3, followed by post-processing by a post-processing liquid applying device 4 in the post-processing process. Subsequently, the printed matter of the present disclosure is obtained by drying with the drying device 5.

Second Embodiment

Figure 2:
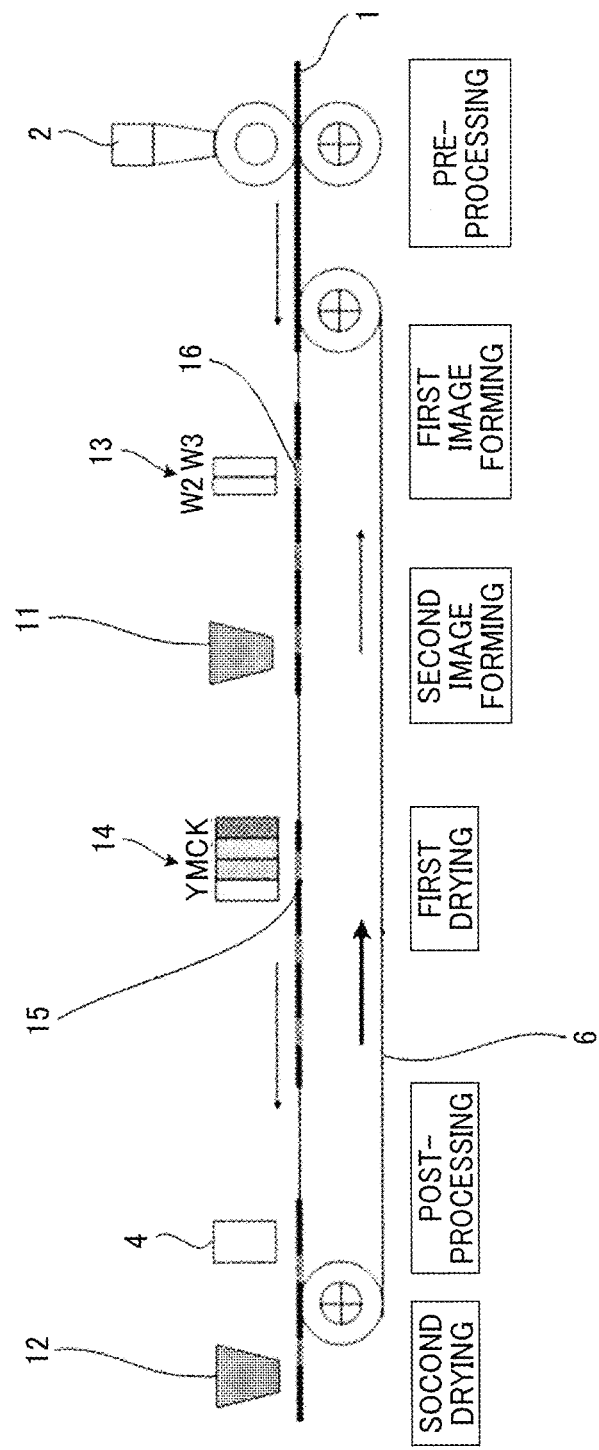
FIG. 2 is a schematic diagram illustrating another example of the printing device of the present disclosure for use in the printing method of the present disclosure.

FIG. 2 is a schematic diagram illustrating an example of the printing device of the second embodiment. The printing device illustrated in FIG. 2 includes a pre-processing liquid application device 2 to apply a pre-processing liquid, a white ink discharging head 13 to discharge the first white ink (W1) and the second white ink (W2), a color ink discharging head 14 to discharge black ink (K), cyan ink (C), magenta ink (M), and yellow ink (Y), the post-processing liquid application device 4 to apply the post-processing liquid, a first drying device 11, a second drying device 12, and the conveyor belt 6 to convey the substrate 1.

First, the pre-processing liquid is applied onto the substrate 1 by the pre-processing liquid application device 2 during the pre-processing step. Next, in the white image forming portion 16 under the white ink discharging head 13, the white ink discharging head 13 discharges the first white ink (W1) and the second white ink (W2), which are dried at the first drying device 11 to superimpose the first white ink image and the second white ink image.

Next, in a color image forming unit 15 below a color ink discharging head 14, the YMCK ink is discharged onto the white ink image by the color ink discharging head 14 to form a YMCK color image. Thereafter, the thus-formed color image is subjected to post-processing by a post-processing liquid applying device 4. Subsequently, the resultant is subjected to drying at the second drying device 12 to obtain the printed matter of the present disclosure.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Preparation Examples 1 of White Ink

Preparation of White Ink 1

Synthesis of Surface-Treated Rutile-Type Titanium Oxide with Oriented Aggregated Strip-Like Particle Form 160 g/L sodium carbonate solution containing a solution containing titanyl sulfate as 100 g/L $TiO_2$ was filtered off and the white precipitate at a liquid temperature of 25 degrees C. was thoroughly rinsed.

After repulping the rinsed orthotitanic acid cake with 200 g/L of dilute hydrochloric acid, the pH was adjusted to 2 with the same dilute hydrochloric acid and peptized at 10 degrees C. for 3 hours.

Subsequently, 400 g/L concentrated hydrochloric acid was added in such a manner that the solution temperature did not exceed 30 degrees C. to adjust the concentration of $TiO_2$ to 100 g/L, and the concentration of hydrochloric acid to 80 g/L.

Next, the solution was heated during stirring. After one-hour hydrolysis at a solution temperature at 30 degrees C., the resultant was subjected to aging at 95 degrees C. for three hours to synthesize rutile type titanium oxide.

The thus-obtained rutile type titanium oxide was observed with a transmission electron microscope to find aggregated particles having a strip-like form in which rod-like particles were oriented to aggregate in a bundle-like form having an appearance average major axis length of 250 nm, an appearance average minor axis length of 60 nm, an appearance average axial ratio of 4.2, and a specific surface area of 75 $m^2/g$.

Surface Treatment

The thus-obtained rutile-type titanium oxide-containing water suspension was heated to 70 degrees C.

Thereafter, 10 percent by mass sodium aluminate in $Al_2O_3$ conversion was slowly added to titanium oxide during stirring. After one-hour stirring, 100 g/L of dilute sulfuric acid was added to adjust the pH to 8.0.

Next, 5 percent by mass sodium stearate was added to titanium oxide. After one-hour stirring, the pH was adjusted to 6.5 with dilute sulfuric acid.

After filtration and rinsing with water, the resultant was dried at 110 degrees C. for 12 hours to obtain surface-treated rutile-type titanium oxide 1 having an oriented aggregated strip-like particle form.

Preparation of White Pigment Dispersion 1

In a 300-mL tall beaker, 30.0 g of an acid-group-containing polymer dispersant (DISPERBYK-2015, effective component of 40 percent by mass, manufactured by BYK Japan KK) and 90.0 g of deionized water were charged, mixed, and dissolved.

Next, 80.0 g of surface-treated rutile-type titanium oxide-1 having a form of oriented aggregated strip-like particles was charged and subjected to pre-dispersion with a magnetic stirrer for 30 minutes. After the pre-dispersion, the resultant was dispersed for one hour at 120 μA using an ultrasonic homogenizer (US-300T, tip diameter of 7 mm, manufactured by NISSEI Corporation). Thereafter, coarse particles were removed with a 400 mesh nylon mesh to obtain a white pigment dispersion 1 (solid content concentration of 40 percent by mass) having a cumulative 50 percent volume particle diameter ($D_{50}$) of 252 nm and a refractive index of 2.30.

Formulation of White Ink 1

15.0 g of propylene glycol, 2.5 g of 3-methoxy-3-methylbutanol, 1.5 g of 2-ethyl-1,3-hexanediol, 0.5 g of a surfactant (EnviroGem ADO 1, manufactured by Nisshin Chemical Co., Ltd.), and 1.5 g of a polyether-modified siloxane compound (Silface SAG 503A, manufactured by Nissin Chemical Co., Ltd.) were loaded in a 200 mL beaker, and mixed and dissolved for 10 minutes by a magnetic stirrer.

Next, 7.5 g of Takelac W-6110 (manufactured by Mitsui Chemicals, Inc.) as binder polymers, 42.5 g of the white pigment dispersion 1 (solid content concentration of 40 percent by mass) obtained above, and water as a balance to make the total 100.0 g were added followed by mixing and stirring with a magnetic stirrer for 20 minutes.

The thus-obtained liquid mixture was filtered with a 25 mL needleless syringe fitted with a filter (acetyl cellulose membrane, outer diameter of 2.5 cm, manufactured by FUJIFILM Corporation) with an average pore diameter of 5.0 µm to remove coarse particles, thereby obtaining White ink 1.

Preparation Examples 2 of White Ink

Preparation of White Ink 2
Preparation of White Pigment Dispersion 2

In a 300-mL tall beaker, 30.0 g of an acid-group-containing polymer dispersant (DISPERBYK-2015, effective component of 40 percent by mass, manufactured by BYK Japan KK) and 90.0 g of deionized water were charged, mixed, and dissolved.

Next, 80 g of the surface-treated rutile type titanium oxide (JR-806, cumulative 50 percent volume particle diameter ($D_{50}$) of 250 nm, manufactured by TAYCA CORPORATION) was added, and pre-dispersed for 30 minutes with a magnetic stirrer.

After the pre-dispersion, the resultant was dispersed for one hour at 120 µA using an ultrasonic homogenizer (US-300T, tip diameter of 7 mm, manufactured by NISSEI Corporation).

Thereafter, coarse particles were removed with a 400 mesh nylon mesh to obtain a white pigment dispersion 2 (solid content concentration of 40 percent by mass) having a cumulative 50 percent volume particle diameter ($D_{50}$) of 265 nm and a refractive index of 2.50.

Preparation of White Ink 2

A white ink 2 was obtained in the same manner as in Preparation Example 1 of the white ink except that the white pigment dispersion 2 was used instead of the white pigment dispersion 1.

Preparation Examples 3 of White Ink

Preparation of White Ink 3
Preparation of White Pigment Dispersion 3

In a 300 mL tall beaker, 30.0 g of an acid-group-containing polymer dispersant (DISPERBYK-2015, manufactured by BYK Japan KK.) and 90.0 g of deionized water were charged, mixed, and dissolved.

Next, 80 g of $SiO_2$—$Al_2O$ surface treated barium sulfate (BARIASE B-34, cumulative 50 percent by mass volume particle diameter ($D_{50}$) of 300 nm, manufactured by SAKAI CHEMICAL INDUSTRY CO., LTD.) was added and pre-dispersed with a magnetic stirrer for 30 minutes.

After the pre-dispersion, the resultant was dispersed for two hours at 120 µA using an ultrasonic homogenizer (US-300T, tip diameter of 7 mm, manufactured by NISSEI Corporation). Thereafter, coarse particles were removed with a 400 mesh nylon mesh to obtain a white pigment dispersion 3 (solid content concentration of 40 percent by mass) having a cumulative 50 percent volume particle diameter ($D_{50}$) of 315 nm and a refractive index of 1.64.

Preparation of White Ink 3

A white ink 3 was obtained in the same manner as in Preparation Example 1 of the white ink except that the white pigment dispersion 3 was used instead of the white pigment dispersion 1.

Preparation Examples 4 of White Ink

Preparation of White Ink 4
Preparation of White Pigment Dispersion 4

In a 300-mL tall beaker, 15 g of an acid-group-containing polymer dispersant (DISPERBYK-180, effective component of 81 percent by mass, amine value of 94 mgKOH/g, manufactured by BYK Japan KK.) and 105.0 g of deionized water were charged, mixed, and dissolved.

Next, 80 g of zinc oxide (XZ-300F-LP, cumulative 50 percent volume particle diameter ($D_{50}$) of 250 nm, manufactured by SAKAI CHEMICAL INDUSTRY CO., LTD.) surface-treated with hydrogen dimethicone was added followed by pre-dispersion for 30 minutes with a magnetic stirrer.

After the pre-dispersion, the resultant was dispersed for two hours at 120 µA using an ultrasonic homogenizer (US-300T, tip diameter of 7 mm, manufactured by NISSEI Corporation). Thereafter, coarse particles were removed with a 400 mesh nylon mesh to obtain a white pigment dispersion 4 (solid content concentration of 40 percent by mass) having a cumulative 50 percent volume particle diameter ($D_{50}$) of 255 nm and a refractive index of 1.95.

Preparation of White Ink 4

A white ink 4 was obtained in the same manner as in Preparation Example 1 of the white ink except that the white pigment dispersion 4 was used instead of the white pigment dispersion 1.

Preparation Examples 5 of White Ink

Preparation of White Ink 5
Synthesis of Hollow Silica Particle I

In a glass beaker, 23.0 g of oleic acid (manufactured by Tokyo Chemical Industry Co., Ltd.) was sufficiently dispersed in 2300 g of water for 30 minutes, using an ultrasonic homogenizer (US-300T, tip diameter of 7 mm, 100 µA, manufactured by Nippon Seiki Co., Ltd.). Thereafter, the dispersion was moved to a plastic container followed by stirring for 60 minutes. Thereafter, a liquid mixture of 21.0 g of 3-aminopropyl trimethoxysilane (APTMS, manufactured by Tokyo Chemical Industry Co. Ltd.) and 115.0 g of tetramethoxysilane (TMOS, manufactured by Tokyo Chemical Industry Co. Ltd.) was slowly dripped to the dispersion to react at 25 degrees C. for 24 hours. Utilizing sol-gel reaction, silica shells were formed on the surface of oleic acid to obtain silica-coated particles.

Next, the thus-obtained silica-coated particle was rinsed and dispersed in water. Furthermore, in order to dissolve oleic acid as the core material, tetrahydrofuran (THF) was added. Subsequent to stirring for 12 hours, the resultant was rinsed with water and concentrated to obtain a 30 percent by mass aqueous dispersion of hollow silica particle I.

In each rinsing process, liquid-liquid replacement was taken to avoid agglomeration that might occur during drying of the silica coated particle or hollow silica particle.

Preparation of White Pigment Dispersion 5

To 100 g of 30 percent by mass aqueous dispersion of the hollow silica particle I, 12.5 g of an acid group-containing polymer dispersant (DISPERBYK-180, amine value of 94 mg KOH/g, effective component of 81 percent by mass, manufactured by BYK Japan KK.) and 7.5 g of water were added followed by sufficiently stirring. Thereafter, the resultant was dispersed for three minutes using an ultrasonic homogenizer (US-300T, tip diameter 7 mm, 100 μA, manufactured by Nippon Seiki Co., Ltd.).

The thus-obtained liquid dispersion was filtered with a membrane filter (cellulose acetate membrane) having an average pore diameter of 10 μm to prepare a white pigment dispersion 5 (hollow silica particle concentration of 25 percent by mass) having a cumulative 50 percent volume particle diameter ($D_{50}$) of 200 nm, a shell thickness of 15 nm, and a refractive index of 1.22.

Preparation of White Ink 5

21.0 g of propylene glycol, 3.5 g of 3-methoxy-3-methylbutanol, 1.5 g of 2-ethyl-1,3-hexanediol, 0.5 g of Enviro-Gem AD01 (manufactured by Nisshin Chemical Co., Ltd.), and 1.5 g of Silface SAG 503A (manufactured by Nissin Chemical Co., Ltd.) were loaded in a 200 mL beaker, and mixed and dissolved for 10 minutes by a magnetic stirrer.

Next, 7.5 g of Takelac W-6110 (manufactured by Mitsui Chemicals, Inc.) as binder polymers, 48.0 g of the white pigment dispersion 5 (solid content concentration of 25 percent by mass) obtained above, and a balance of deionized water to make the total 100.0 g followed by mixing and stirring with a magnetic stirrer for 20 minutes.

The thus-obtained liquid mixture was filtered with a 25 mL needleless syringe fitted with a filter (acetyl cellulose membrane, outer diameter of 2.5 cm, manufactured by FUJIFILM Corporation) with an average pore diameter of 5.0 m to remove coarse particles, thereby obtaining White ink 5.

Preparation Examples 6 of White Ink

Preparation of White Ink 6

Synthesis of Hollow Silica Particle II

In a glass beaker, 23.0 g of non-cross-linked acrylic resin particle (Finesphere FS-201, styrene-acrylic resin, particle diameter of 0.5 μm, manufactured by Nipponpaint Industrial Coatings Co., LTD.) was sufficiently dispersed in 2300 g of water using an ultrasonic homogenizer (US-300T, tip diameter of 7 mm, 100 μA, 30 minutes, manufactured by NISSEI Corporation).

Thereafter, the dispersion was moved to a plastic container followed by stirring for 60 minutes. Thereafter, a liquid mixture of 21.0 g of 3-aminopropyl trimethoxysilane (APTMS, manufactured by Tokyo Chemical Industry Co. Ltd.) and 115.0 g of tetramethoxysilane (TMOS, manufactured by Tokyo Chemical Industry Co. Ltd.) was slowly dripped to the dispersion to react at 25 degrees C. for 24 hours. Utilizing sol-gel reaction, silica shells were formed on the surface of non-cross-linked acrylic resin particle to obtain silica-coated particles.

Next, the thus-obtained silica-coated particle was rinsed and dispersed in water. Furthermore, in order to dissolve the non-cross-linked acrylic resin particles of the core material, tetrahydrofuran (THF) was added. Subsequent to stirring for 12 hours, the resultant was rinsed with water and concentrated to obtain a 30 percent by mass aqueous dispersion of hollow silica particle II.

In each rinsing process, liquid-liquid replacement was taken to avoid agglomeration that might occur during drying of the silica coated particle or hollow silica particle.

Preparation of White Pigment Dispersion 6

To 100 g of 30 percent by mass aqueous dispersion of the inorganic hollow particle II, 12.5 g of an acid group-containing polymer dispersant (DISPERBYK-180, amine value of 94 mg KOH/g, effective component of 81 percent by mass, manufactured by BYK Japan KK.) and 7.5 g of water were added followed by sufficiently stirring. Thereafter, the resultant was dispersed for three minutes using an ultrasonic homogenizer (US-300T, tip diameter 7 mm, 100 μA, manufactured by Nippon Seiki Co., Ltd.).

The thus-obtained liquid dispersion was filtered with a membrane filter (cellulose acetate membrane) having an average pore diameter of 10 μm to prepare a white pigment dispersion 6 (hollow silica particle concentration of 25 percent by mass) having a cumulative 50 percent volume particle diameter ($D_{50}$) of 550 nm, a shell thickness of 35 nm, and a refractive index of 1.25.

Preparation of White Ink 6

21.0 g of propylene glycol, 3.5 g of 3-methoxy-3-methylbutanol, 1.5 g of 2-ethyl-1,3-hexanediol, 0.5 g of Enviro-Gem AD01 (manufactured by Nisshin Chemical Co., Ltd.), and 1.5 g of Silface SAG 503A (manufactured by Nissin Chemical Co., Ltd.) were loaded in a 200 mL beaker, and mixed and dissolved for 10 minutes by a magnetic stirrer.

Next, 7.5 g of Takelac W-6110 (manufactured by Mitsui Chemicals, Inc.) as binder polymers, 48.0 g of the white pigment dispersion 6 (solid content concentration of 25 percent by mass) obtained above, and water as a balance to make the total 100.0 g were added followed by mixing and stirring with a magnetic stirrer for 20 minutes.

The thus-obtained liquid mixture was filtered with a 25 mL needleless syringe fitted with a filter (acetyl cellulose membrane, outer diameter of 2.5 cm, manufactured by FUJIFILM Corporation) with an average pore diameter of 5.0 m to remove coarse particles, thereby obtaining White ink 6.

Preparation Examples 7 of White Ink

Preparation of White Ink 7

Preparation of White Pigment Dispersion 7

Preparation of Seed Particle 109.5 g of water as a medium, 0.2 g of sodium dodecylbenzenesulfonate (F65, manufactured by Kao Corporation) as an emulsifier, and 0.5 g of sodium persulfate as a polymerization initiator were loaded in a 2-liter reaction vessel.

On the other hand, 90 g of methyl methacrylate, 10 g of methacrylic acid, 0.5 g of octyl thioglycollate as a molecular weight modifier, 0.1 g of an emulsifier (F65, manufactured by Kao Corporation), and 40 g of water were mixed and stirred to obtain an aqueous dispersion of a monomer mixture.

20 percent by mass of the aqueous dispersion of this monomer mixture was charged into the reaction vessel, and the solution in the reaction vessel was heated to a temperature of 75 degrees C. with stirring to carry out a polymerization reaction for one hour, and thereafter, the temperature was raised to 75 degrees C. The aqueous dispersion of the remaining monomer mixture was continuously added to the reaction vessel over two hours while maintaining the temperature followed by aging for two hours to obtain an aqueous dispersion of seed particle having a solid content of 40 percent by mass, a cumulative 50 percent volume particle diameter ($D_{50}$) of 200 nm, and a weight average molecular weight of 70,000.

Synthesis of Polymer Particle A1

186 g of water was previously charged as a medium. Thereafter, 10 g (25 g as the aqueous dispersion) of the aqueous dispersion of the seed particles prepared in the preparation example of the seed particles and 0.5 g of sodium persulfate as a polymerization initiator were added to a 2 litter reaction vessel.

Also, 69.5 g of methyl methacrylate, 30 g of methacrylic acid, 0.5 g of divinylbenzene (purity of 55 percent), 0.1 g of an emulsifier (F65, manufactured by Kao Corporation), and 40 g of water were mixed and stirred to obtain an aqueous dispersion of a monomer mixture.

Next, the liquid in the reaction vessel was heated to and maintained at 80 degrees C. during stirring, and the aqueous dispersion of the monomer mixture was continuously charged into the reaction vessel in 3 hours.

Subsequent to aging for two hours, an aqueous dispersant of a polymer particle A1 was obtained which had a solid content of 31 percent by mass and cumulative 50 percent volume particle diameter ($D_{50}$) of 410 nm.

Synthesis of Hollow Polymer Particles 240 g of water was previously charged as a medium in a two-litter reaction vessel. A solid content of 50 g (161.3 g as aqueous dispersion) of the aqueous dispersion of the polymer particle A1, 20 g of styrene, and 0.4 g of sodium persulfate as a polymerization initiator were added to the reaction vessel.

Also, 79.5 g of styrene, 0.1 g of an emulsifier (F65, manufactured by Kao Corporation), and 40 g of water were mixed and stirred to prepare an aqueous dispersion of a monomer.

Next, while stirring the liquid in the reaction vessel, the temperature was raised to and maintained at 80 degrees C. to polymerize styrene in 30 minute, thereby obtaining a polymer particle in which styrene was complexed with the polymer particle A1. Subsequently, the liquid in the reaction vessel was heated to and maintained at 80 degrees C. during stirring, and the aqueous dispersion of the monomer was continuously charged into the reaction vessel in 4 hours.

0.5 g of acrylic acid was collectively put into the reaction vessel to copolymerize with styrene two hours after loading of the aqueous dispersion of the monomer.

Further, immediately after all the aqueous dispersion of the monomer was charged into the reaction vessel, core-shell polymer particle B1 was obtained in which styrene and acrylic acid were polymerized and laminated on the surface layer of the polymer particle A1.

Approximately 15 minutes later after charging of all the monomers, 5 parts by mass of 25 percent by mass ammonium hydroxide was collectively charged during stirring and the temperature was raised to 90 degrees C. and thereafter, the resultant was stirred for two hours for aging.

The proportion of the unreacted monomer of styrene and acrylic acid immediately before the addition of 25 percent by mass ammonium hydroxide to the entire of added styrene and acrylic acid was 3 percent by mass.

Thereafter, 0.3 g of t-butyl hydroperoxide and 0.1 g of formaldehyde resin were added, and the resultant was left to stir for one hour to obtain a white pigment dispersion 7 of hollow and spherical polymer particle having a solid content of 25 percent by mass, a cumulative 50 percent volume particle diameter ($D_{50}$) of 850 nm, a shell thickness of 50 nm, a volume porosity of 69 percent, and a refractive index of 1.22.

Preparation of White Ink 7

21.0 g of propylene glycol, 3.5 g of 3-methoxy-3-methylbutanol, 1.5 g of 2-ethyl-1,3-hexanediol, 0.5 g of Enviro-Gem AD01 (manufactured by Nisshin Chemical Co., Ltd.), and 1.5 g of Silface SAG 503A (manufactured by Nissin Chemical Co., Ltd.) were loaded in a 200 mL beaker, and mixed and dissolved for 10 minutes by a magnetic stirrer.

Next, 7.5 g of Takelac W-6110 (manufactured by Mitsui Chemicals, Inc.) as binder polymers, 48.0 g of the white pigment dispersion 7 (solid content concentration of 25 percent by mass) obtained above, and a balance of deionized water to make the total 100.0 g followed by mixing and stirring with a magnetic stirrer for 20 minutes.

The thus-obtained liquid mixture was filtered with a 25 mL needleless syringe fitted with a filter (acetyl cellulose membrane, outer diameter of 2.5 cm, manufactured by FUJIFILM Corporation) with an average pore diameter of 5.0 m to remove coarse particles, thereby obtaining White ink 7.

Preparation Examples 8 of White Ink

Preparation of White Ink 8

21.0 g of propylene glycol, 3.5 g of 3-methoxy-3-methylbutanol, 1.5 g of 2-ethyl-1,3-hexanediol, 0.5 g of Enviro-Gem AD01 (manufactured by Nisshin Chemical Co., Ltd.), and 1.5 g of Silface SAG 503A (manufactured by Nissin Chemical Co., Ltd.) were loaded in a 200 mL beaker, and mixed and dissolved for 10 minutes by a magnetic stirrer.

Next, as a binder polymer, 7.5 g of Takelac W-6110 (manufactured by Mitsui Chemicals, Inc.), 40.0 g of hollow polymer particles (ULTRA-E, solid concentration of 30 percent by mass, cumulative 50 percent volume particle diameter ($D_{50}$) of 424 nm, shell thickness of 35 nm, hollow ratio of 58 percent by volume, refractive index of 1.23), and a balance of deionized water to make the total 100.0 g were added and mixed and stirred with a magnetic stirrer for 20 minutes.

The thus-obtained liquid mixture was filtered with a 25 mL needleless syringe fitted with a filter (acetyl cellulose membrane, outer diameter of 2.5 cm, manufactured by FUJIFILM Corporation) with an average pore diameter of 5.0 m to remove coarse particles, thereby obtaining White ink 8.

Next, ink properties of the obtained White inks 1 to 8 were measured as follows. The results are shown in Tables 1 and 2.

Measuring of Viscosity

Viscosity of each White ink was measured by a viscometer (RE-85L, manufactured by TOKI SANGYO CO., LTD.) at 25 degrees C.

Measuring of Cumulative 50 Percent Volume Particle Diameter ($D_{50}$)

Cumulative 50 percent volume particle diameter ($D_{50}$) of the white pigment in each White ink was measured at 25 degrees C. using Microtrac UPA-EX 150 (manufactured by Microtrac Inc.).

Refractive Index

The refractive index of the white pigment in each White ink was measured by an Abbe refractometer Model AR-1 TSORID, manufactured by ATAGO CO., LTD.

Measuring of pH pH of each White ink was measured at 25 degrees C. using a pH meter (HM-30R type, manufactured by DKK-TOA CORPORATION).

Measurement of Static Surface Tension

Static surface tension of each White ink was measured at 25 degrees C. using an automatic surface tensiometer (DY-300, manufactured by KYOWA INTERFACE SCIENCE Co., Ltd.).

TABLE 1

|  |  | Preparation Example 1 | Preparation Example 2 | Preparation Example 3 | Preparation Example 4 |
|---|---|---|---|---|---|
| White ink No. |  | White ink 1 | White ink 2 | White ink 3 | White ink 4 |
| White pigment |  | Rutile type $TiO_2$ | Rutile type $TiO_2$ | Barium sulfate | Zinc oxide |
| Refractive index of white pigment |  | 2.3 | 2.5 | 1.64 | 1.95 |
| Ink properties | Ink viscosity (mPa · s) | 7.69 | 7.27 | 7.43 | 7.80 |
|  | Cumulative 50 percent volume particle diameter (nm) | 268 | 280 | 322 | 262 |
|  | pH | 8.4 | 8.0 | 8.1 | 8.3 |
|  | Static surface tension (mN/m) | 21.9 | 21.3 | 21.5 | 21.2 |

TABLE 2

|  |  | Preparation Example 5 | Preparation Example 6 | Preparation Example 7 | Preparation Example 8 |
|---|---|---|---|---|---|
| White ink No. |  | White ink 5 | White ink 6 | White ink 7 | White ink 8 |
| White pigment |  | Hollow silica | Hollow silica | Hollow polymer | Hollow polymer |
| Refractive index of white pigment |  | 1.22 | 1.25 | 1.22 | 1.23 |
| Ink properties | Ink viscosity (mPa · s) | 7.62 | 8.11 | 8.52 | 7.39 |
|  | Cumulative 50 percent volume particle diameter (nm) | 233 | 594 | 866 | 439 |
|  | pH | 8.1 | 8.2 | 8.5 | 8.4 |
|  | Static surface tension (mN/m) | 21.7 | 21.8 | 22.1 | 21.8 |

Examples 1 to 13 and Comparative Examples 1 to 12

Printing

Regarding Examples 1 to 13 and Comparative Examples 1 to 12 shown in Table 3, the following pre-processing liquid was applied to a corona-treated surface of FOS #60 (corona-treated biaxially oriented polypropylene film, manufactured by Futamura Chemical Co., Ltd.). The white ink shown in Table 3 was printed on the dried film in a predetermined adhesion amount of ink shown described below to obtain printed matter. In addition, the printing device having the configuration illustrated in FIG. 1 was used.

Preparation of Pre-Processing Liquid

The following prescription was charged into a 200 mL beaker, and mixed for 30 minutes during stirring to prepare a pre-processing solution.

Prescription of Pre-Processing Liquid

Nonionic polyester urethane emulsion PUE-1370 (solid content concentration of 47 percent by mass, manufactured by Murayama Chemical Laboratory Ltd.): 21.28 g Magnesium sulfate: 10.00 g 1,2-propane diol: 20.00 g Glycerin: 10.00 g Polyether modified siloxane (BYK-348, effective component of 100 percent, manufactured by BYK Japan KK.): 0.20 g Deionized water: 38.52 g Application of Pre-Processing Liquid The pre-processing liquid was uniformly applied to the corona-treated surface of FOS #60 (corona-treated biaxially oriented polypropylene film, manufactured by FUTAMURA CHEMICAL CO., LTD.) with a wire bar having a wire diameter of 0.05 mm in such a manner that the adhesion amount of the pre-processing liquid was 4.00 g/m. Thereafter, the film was placed in a natural convection type dryer whose internal temperature was set at 80 degrees C. and dried for two minutes to prepare a pre-processing liquid coated film.

White Ink Printing Evaluation

The pigment solid content adhesion amount of the first white ink of the first white ink layer was 0.84 g/m² on the pre-processing liquid coated film. Moreover, the second white ink was applied in such a manner that the adhesion amount of the solid content of the pigment in the second white ink of the second white ink layer was 0.84 g/m². Thereafter, the film was placed in a natural convection type dryer whose internal temperature was set at 80 degrees C. and dried for two minutes. The adhesion amount of each white ink was adjusted by changing the drive voltage of the discharging head to adjust the discharging amount. The first white ink and the second white ink were discharged from different nozzle arrays using a discharging head having a plurality of nozzle arrays as illustrated in FIG. 3.

First, the ink adhesion amount was adjusted in such a manner that the pigment solid content adhesion amount of the white ink was 1.68 g/m² in total. The adhesion amount of the White ink 1 to 4 was 9.89 g/m² and the adhesion amount of the White ink 5 to 8 was 14.02 g/m².

For Examples and Comparative Examples which provided both the first white ink layer and the second white ink layer, the ink adhesion amount was halved. The ink adhesion amount was as described above for Comparative Examples in which only the first white ink layer was provided.

The printed image printed on the pre-processing liquid coated film was a solid image of 60 mm×180 mm created by Microsoft Word 2003 (registered trademark) and after printing, the printed matter was set in a natural convection dryer whose internal temperature was set at 80 degrees C. and dried for two minutes. After being left undone for one night at room temperature (25 degrees C.), the printed matter was evaluated.

Next, properties were evaluated in the following manner regarding Examples 1 to 13 and Comparative Examples 1 to 12. The results are shown in Table 3.

Figure 5:
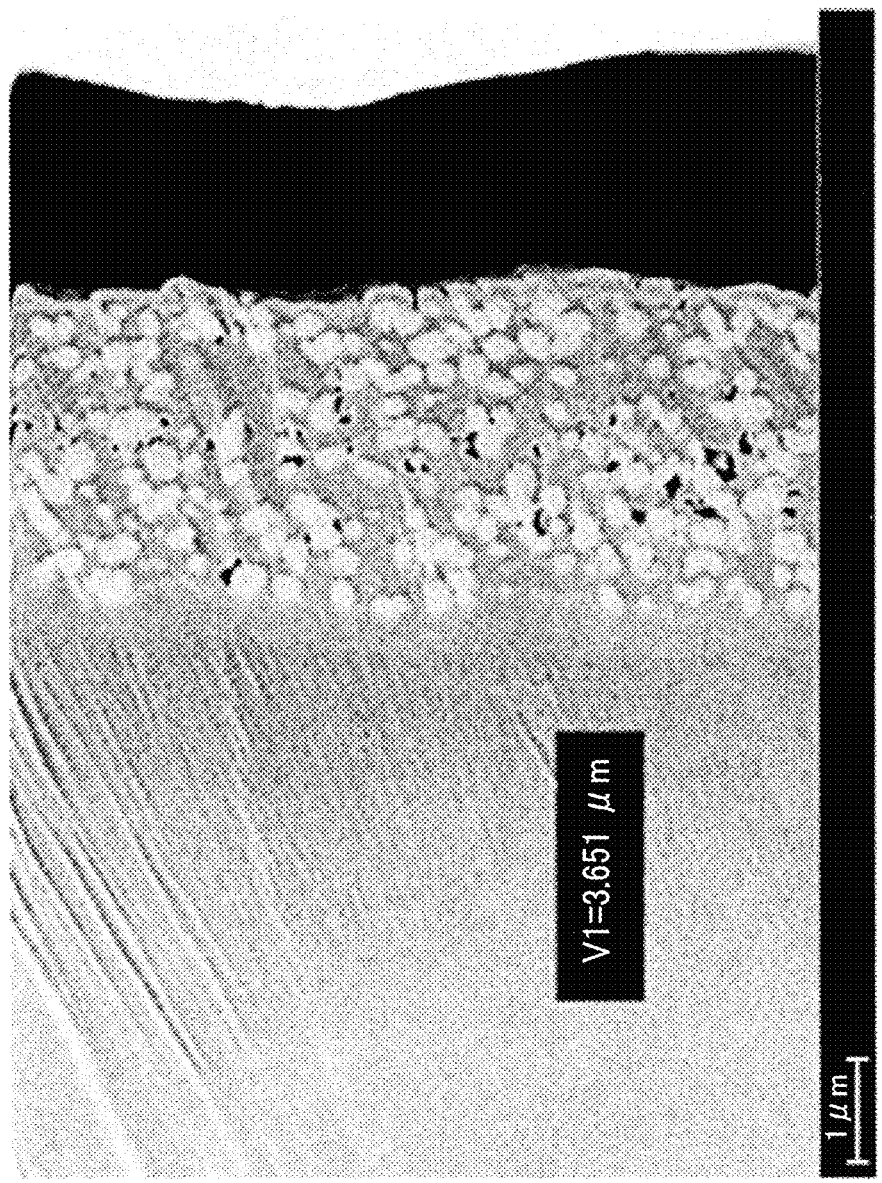
FIG. 5 is a cross-section of a scanning electron microscope (SEM) photo of a titanium oxide image portion of Comparative Example 1, which is described later.
Figure 6:
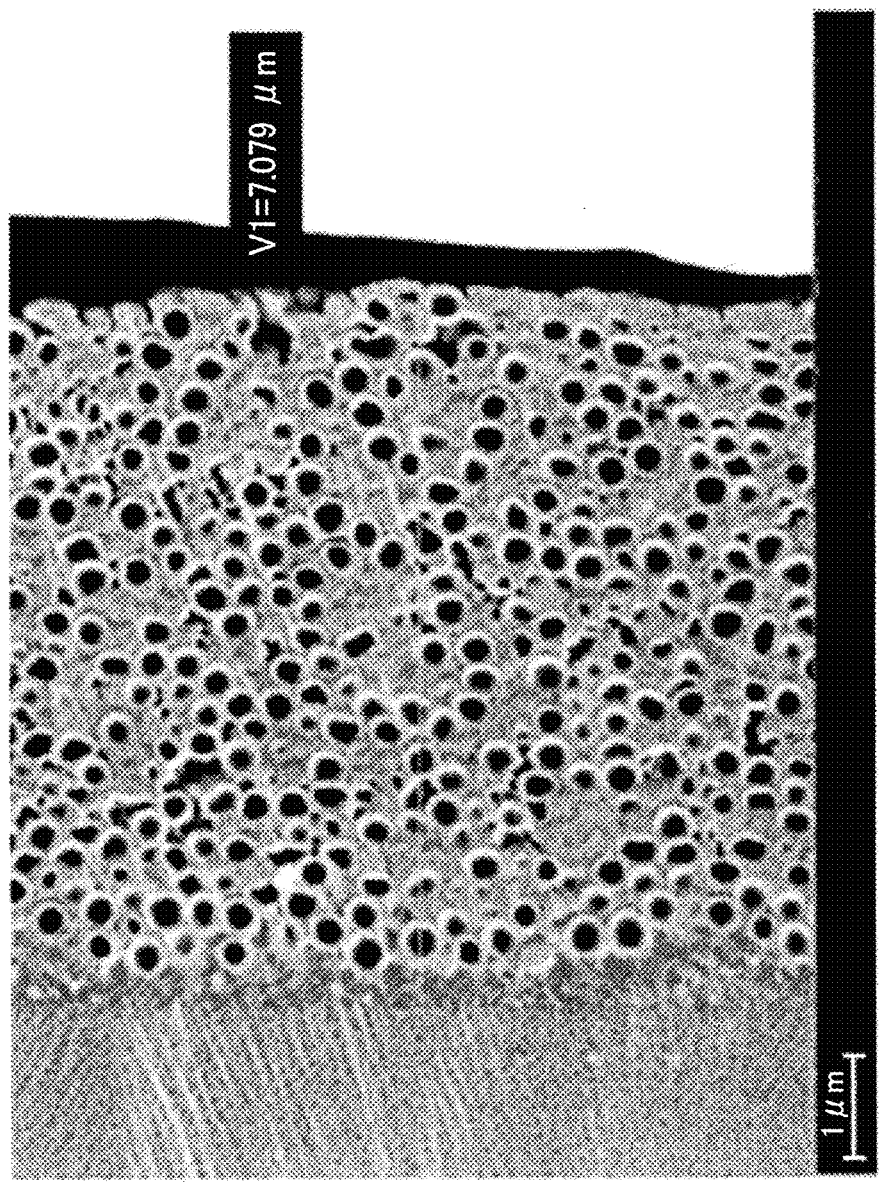
FIG. 6 is a cross-section of an SEM photo of a hollow resin particle alone image portion of Comparative Example 7, which is described later.
Figure 7:
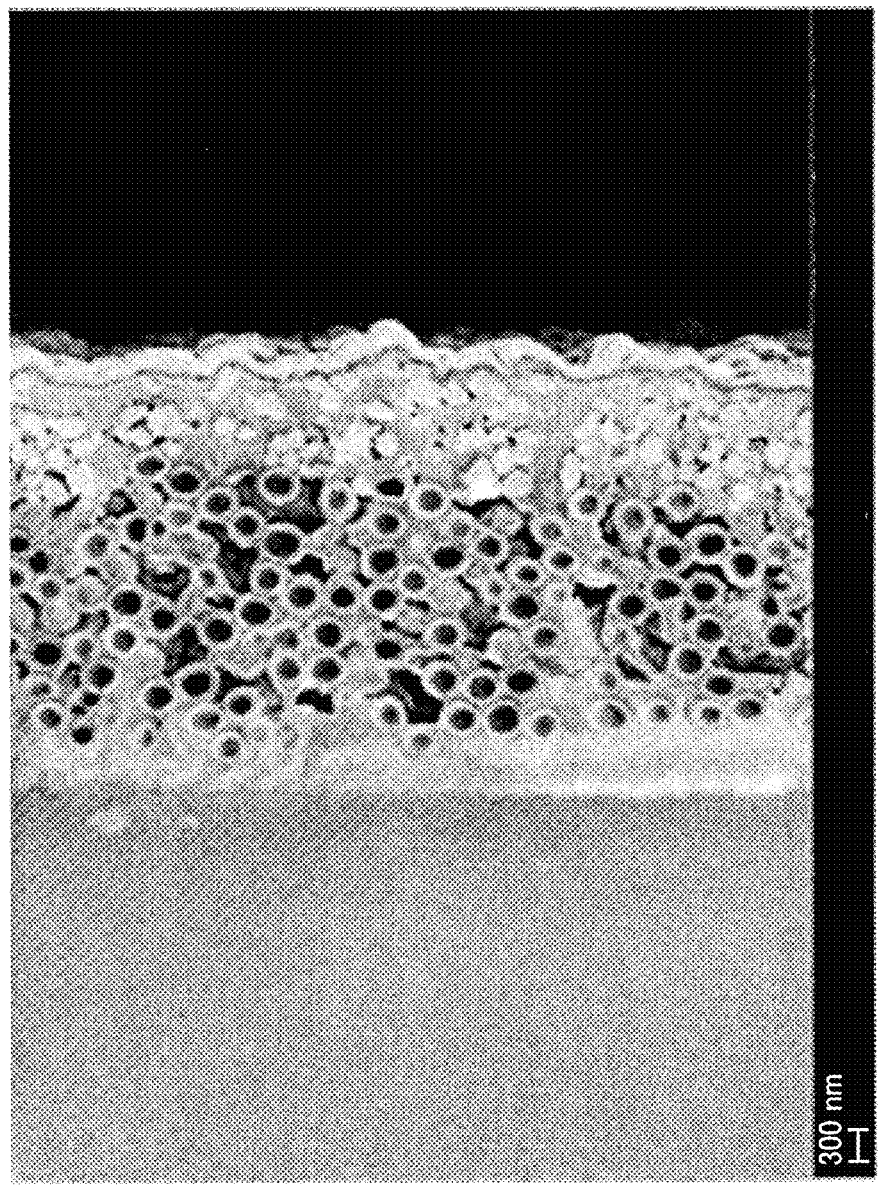
FIG. 7 is a cross-section of an SEM photo of an image portion in which a titanium oxide layer is provided on the hollow resin particle layer of Example 9, which is described later.

FIG. 5 is a cross-section of an SEM photograph of titanium oxide single image portion of Comparative Example 1. FIG. 6 is a cross-section of an SEM photograph of hollow resin particle single image portion of Comparative Example 7. FIG. 7 is a cross-section of an SEM photo of an image portion in which a titanium oxide layer is provided on the hollow resin particle layer of Example 9. As seen in the results shown in Table 3 to FIGS. 5 to 7, it is possible to strike a balance between Hunter's brightness, abrasion resistance, and heat resistance when forming a titanium oxide layer on the hollow resin particle layer as in Example 9.

Hunter's Brightness

Lumina color black (310 g/m², manufactured by Oji F-Tex Co., Ltd.) was placed under the printed matter obtained in the white ink printing evaluation, the printed part was subjected to measuring L*, a*, and b* using a spectrophotometric densitometer (X-Rite eXact, manufactured by X-Rite). Hunter's brightness was calculated according to the following expression 1 to evaluate the whiteness based on the following criteria. Grade C or above is determined as practically usable.

Hunter's brightness=100−[(100−$L^*$)²+($a^{*2}$+$b^{*2}$)]0.5    Expression 1

Evaluation Criteria
A: Hunter's brightness was 80 or more
B: Hunter's brightness was from 77 to less than 80
C: Hunter's brightness was from 74 to less than 77
D: Hunter's brightness was from 71 to less than 74
E: Hunter's brightness was less than 71

Heat Resistance The printed matter obtained in the white ink printing evaluation was put into a natural convection type dryer whose internal temperature was set at 100 degrees C., heated for two minutes, and cooled down to room temperature (25 degrees C.). Thereafter, Hunter's brightness of the printed matter was measured in the same manner as for the evaluation for Hunter's brightness.

Hunter's brightness was measured before and after the heating. According to the following expression 2, the decrease in Hunter's brightness was calculated to evaluate heat resistance based on the following evaluation criteria. Grade B or above is determined as practically usable.

Hunter's brightness decrease=pre-heating Hunter's brightness−post-heating Hunter's brightness    Expression 2

Evaluation Criteria
A: Hunter's brightness decrease was less than 2
B: Hunter's brightness decrease was from 2 to less than 5
C: Hunter's brightness decrease was 5 or more Abrasion Resistance The printed matter evaluated on Hunter's brightness of the printer image was set in an abrasion tester (Crockmeter, manufactured by Toyo Seiki Seisakusho Co., Ltd.) and rubbed back and forth 10 times with a cotton cloth. The abraded state of the rubbed image area was visually observed to evaluate the abrasion resistance according to the following evaluation criteria. Grade B or above is determined as practically usable.

Evaluation Criteria
A: No abrasion mark
B: Very slightly abraded
C: Slightly abraded
D: Severely abraded

TABLE 3

| | First white ink | | Second white ink | | Absolute value $|R_A - R_B|$ of refractive index difference of white pigment |
|---|---|---|---|---|---|
| | Kind | Refractive index $R_A$ of first white pigment | Kind | Refractive index $R_B$ of second white pigment | |
| Example 1 | Ink 2 | 2.5 | Ink 4 | 1.95 | 0.55 |
| Example 2 | Ink 1 | 2.3 | Ink 3 | 1.64 | 0.66 |
| Example 3 | Ink 2 | 2.5 | Ink 3 | 1.64 | 0.86 |
| Example 4 | Ink 4 | 1.95 | Ink 6 | 1.25 | 0.70 |
| Example 5 | Ink 4 | 1.95 | Ink 8 | 1.23 | 0.72 |
| Example 6 | Ink 1 | 2.3 | Ink 5 | 1.22 | 1.08 |
| Example 7 | Ink 1 | 2.3 | Ink 6 | 1.25 | 1.05 |
| Example 8 | Ink 1 | 2.3 | Ink 7 | 1.22 | 1.08 |
| Example 9 | Ink 1 | 2.3 | Ink 8 | 1.23 | 1.07 |
| Example 10 | Ink 5 | 1.22 | Ink 2 | 2.5 | 1.28 |
| Example 11 | Ink 6 | 1.25 | Ink 2 | 2.5 | 1.25 |
| Example 12 | Ink 7 | 1.22 | Ink 2 | 2.5 | 1.28 |
| Example 13 | Ink 8 | 1.23 | Ink 2 | 2.5 | 1.27 |
| Comparative Example 1 | Ink 1 | 2.3 | — | — | — |
| Comparative Example 2 | Ink 2 | 2.5 | — | — | — |
| Comparative Example 3 | Ink 3 | 1.64 | — | — | — |
| Comparative Example 4 | Ink 4 | 1.95 | — | — | — |
| Comparative Example 5 | Ink 5 | 1.22 | — | — | — |
| Comparative Example 6 | Ink 6 | 1.25 | — | — | — |
| Comparative Example 7 | Ink 7 | 1.22 | — | — | — |
| Comparative Example 8 | Ink 8 | 1.23 | — | — | — |
| Comparative Example 9 | Ink 1 | 2.3 | Ink 4 | 1.95 | 0.35 |
| Comparative Example 10 | Ink 3 | 1.64 | Ink 4 | 1.95 | 0.31 |
| Comparative Example 11 | Ink 5 | 1.22 | Ink 7 | 1.22 | 0 |
| Comparative Example 12 | Ink 6 | 1.25 | Ink 8 | 1.23 | 0.02 |

| | Image evaluation | | |
|---|---|---|---|
| | Hunter's brightness | Heat resistance | Scratch resistance |
| Example 1 | C | A | A |
| Example 2 | C | A | A |
| Example 3 | C | A | A |
| Example 4 | B | A | A |
| Example 5 | B | B | A |
| Example 6 | A | A | A |
| Example 7 | A | A | A |
| Example 8 | A | B | B |

TABLE 3-continued

| | | | |
|---|---|---|---|
| Example 9 | A | B | A |
| Example 10 | A | A | A |
| Example 11 | A | A | A |
| Example 12 | A | A | A |
| Example 13 | A | A | A |
| Comparative Example 1 | D | A | A |
| Comparative Example 2 | D | A | A |
| Comparative Example 3 | E | A | A |
| Comparative Example 4 | E | A | A |
| Comparative Example 5 | D | A | A |
| Comparative Example 6 | D | A | A |
| Comparative Example 7 | D | B | C |
| Comparative Example 8 | D | B | B |
| Comparative Example 9 | E | A | A |
| Comparative Example 10 | E | A | A |
| Comparative Example 11 | D | B | C |
| Comparative Example 12 | D | B | B |

Example 14

Preparation Example 1 of Cyan Ink
Preparation of Surface Reformed Cyan Pigment Dispersion 1 kg of pigment dispersion (SENSIJET SMART Cyan 3154BA (Pigment Blue 15:4 surface treated dispersion, solid portion of 14.5 percent by mass, manufactured by SENSIENT Corporation) was subject to acid deposition with 0.1 N HCL aqueous solution. Next, pH of the pigment dispersion was adjusted to 9 with 40 percent by mass benzyltrimethyl ammonium hydroxide solution (methanol solution). 30 minutes later, a reformed pigment dispersion was obtained.

The obtained modified pigment dispersion and highly deionized water were used to conduct ultrafiltration using a dialysis membrane. Moreover, the resultant was subject to ultrasonic wave dispersion to obtain a reformed pigment dispersion in which the solid pigment portion was concentrated to 20 percent by mass.

The cumulative 50 percent volume particle diameter ($D_{50}$) of the thus-obtained dispersion was 116 nm as measured by a particle size distribution measuring instrument (NANOTRAC UPA-EX150, manufactured by NIKKISO CO., LTD.).

Preparation of Cyan Ink 1

20.00 g of 1,2-propanediol, 20.00 g of 1,2-butanediol, 4.00 g of 2,2,4-trimethyl-1,3-pentanediol, and 0.20 g of polyether-modified siloxane (BYK-348, effective component of 100 percent, manufactured by BYK Japan KK.) was loaded in a container equipped with a stirrer and stirred for 30 minutes for homogenization.

Next, 0.05 g of a mildew-proofing agent (Proxel GXL, manufactured by Avecia Inkjet Limited), 0.20 g of 2-amino-2-ethyl-1,3-propanediol, 22.50 g of a surface-modified cyan pigment dispersion, and 8.85 g of a polycapolyurethane emulsion (Takelac W-6110, effective component of 33.9 percent by mass, manufactured by Mitsui Chemicals, Inc.), and a balance of deionized water to make the total 100 g were added followed by stirring for 60 minutes to prepare uniform ink.

Thereafter, the thus-obtained ink was filtrated with a polyvinilydene fluoride membrane filter having an average pore diameter of 1.2 m under pressure to remove coarse particles and dust and prepare cyan ink 1.

Image Evaluation

Onto the white ink printed sample of Example 1, the obtained cyan ink 1 was applied in an amount of 9.89 g/m² to form an image. This image was evaluated to find that very vivid cyan image was obtained.

Aspects of the present disclosure are, for example, as follows.

1. A printing method includes discharging a first white ink containing a first white pigment and a second white ink containing a second white pigment by a discharging head, wherein the following relationship is satisfied: $|R_A-R_B|\geq 0.5$, where $R_A$ represents a refractive index of the first white pigment and $R_B$ represents a refractive index of the second white pigment.

2. The printing method according to 1 mentioned above, wherein the discharging head includes a plurality of nozzle arrays, wherein the first white ink and the second white ink are discharged from different nozzle arrays of the plurality of nozzle arrays.

3. The printing method according to 1 or 2 mentioned above, wherein one of the first white pigment and the second white pigment contains a hollow polymer particle having a refractive index of from 1.2 to 1.3 or a hollow silica particle having a refractive index of from 1.2 to 1.3.

4. The printing method according to any one of 1 to 3 mentioned above, wherein one of the first white pigment and the second white pigment contains a hollow polymer particle having a refractive index of from 1.2 to 1.3 or a hollow silica particle having a refractive index of from 1.2 to 1.3, wherein the other of the first white pigment and the second white pigment contains titanium oxide having a refractive index of from 2.3 to 2.75.

5. The printing method according to any one of 1 to 4 mentioned above further includes forming a first white ink layer with the first white ink and forming a second white ink layer with the second white ink on the first white ink layer.

6. The printing method according to 5 mentioned above further includes forming a third ink layer with a non-white ink on the second white ink layer.

7. The printing method according to 6 mentioned above, wherein the third ink is at least one member selected from the group consisting of a black ink, a cyan ink, a magenta ink, and a yellow ink.

8. A printing device includes a discharging device including a discharging head, configured to discharge a first white ink containing a first white pigment and a second white ink containing a second white pigment by the discharging head, wherein the following relationship is satisfied: $|R_A-R_B|\geq 0.5$, where $R_A$ represents a refractive index of the first white pigment and $R_B$ represents a refractive index of the second white pigment.

9. The printing device according to 8 mentioned above, further includes an ink accommodating unit including a first ink accommodating unit accommodating the first white ink and a second ink accommodating unit accommodating the second white ink.

10. The printing device according to 8 or 9 mentioned above, wherein the discharging head includes a plurality of nozzle arrays, wherein the first white ink and the second white ink are discharged from different nozzle arrays of the plurality of nozzle arrays.

11. The printing device according to any one of 8 to 10 mentioned above, wherein one of the first white pigment and the second white pigment contains a hollow polymer particle having a refractive index of from 1.2 to 1.3 or a hollow silica particle having a refractive index of from 1.2 to 1.3.

12. The printing device according to any one of 8 to 11 mentioned above, wherein one of the first white pigment and the second white pigment contains a hollow polymer particle having a refractive index of from 1.2 to 1.3 or a hollow silica particle having a refractive index of from 1.2 to 1.3, wherein the other of the first white pigment and the second white pigment contains titanium oxide having a refractive index of from 2.30 to 2.75.

13. The printing device according to any one of 8 to 12 mentioned above forms a first white ink layer with the first white ink and forming a second white ink layer on the first white ink layer with the second white ink.

14. The printing device according to 13 mentioned above forms a third ink layer on the second white ink layer with a non-white ink.

15. The printing device according to 14 mentioned above, wherein the third ink is at least one member selected from the group consisting of a black ink, a cyan ink, a magenta ink, and a yellow ink.

16. Printed matter includes a substrate, a first white ink layer formed on the substrate with a first white ink containing a first white pigment and a second white ink layer formed on the substrate with a second white ink containing a second white pigment, wherein the first white pigment includes a hollow polymer particle having a refractive index of from 1.2 to 1.3 or a hollow silica particle having a refractive index of from 1.20 to 1.3, wherein the second white pigment contains titanium oxide having a refractive index of from 2.30 to 2.75.

17. Printed matter includes a substrate, a first white ink layer formed on the substrate with a first white ink containing a first white pigment and a second white ink layer formed on the substrate with a second white ink containing a second white pigment, wherein the first white pigment contains a hollow polymer particle or a hollow silica particle having a refractive index of from 1.2 to 1.3, wherein the following relationship is satisfied: $|R_A - R_B| \geq 0.5$, where $R_A$ represents a refractive index of the first white pigment and $R_B$ represents a refractive index of the second white pigment.

18. The printed matter according to 16 or 17 further includes a third ink layer with a non-white ink.

19. The printed matter according to 18 mentioned above, wherein the first white ink layer is formed on the substrate, the second white ink layer is formed on the first white ink layer, and the third ink layer is formed on the second white ink layer.

20. The printed matter according to any one of 16 to 19 mentioned above, wherein the substrate is a non-permeable substrate.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A printing method, comprising:
   discharging a first white ink comprising a first white pigment and a second white ink comprising a second white pigment by a discharging head,
   wherein the following relationship is satisfied:
   $|R_A - R_B| \geq 1.0$, where $R_A$ represents a refractive index of the first white pigment and $R_B$ represents a refractive index of the second white pigment.

2. The printing method according to claim 1,
   wherein the discharging head comprises a plurality of nozzle arrays,
   wherein the first white ink and the second white ink are discharged from different nozzle arrays of the plurality of nozzle arrays.

3. The printing method according to claim 1, wherein one of the first white pigment and the second white pigment comprises a hollow polymer particle or a hollow silica particle each of which has a refractive index of from 1.2 to 1.3.

4. The printing method according to claim 1, wherein one of the first white pigment and the second white pigment comprises a hollow polymer particle or a hollow silica particle each of which has a refractive index of from 1.2 to 1.3, wherein another of the first white pigment and the second white pigment comprises a titanium oxide having a refractive index of from 2.30 to 2.75.

5. The printing method according to claim 1, further comprising forming a first white ink layer with the first white ink and forming a second white ink layer with the second white ink on the first white ink layer.

6. The printing method according to claim 5, further comprising forming a third ink layer with a non-white ink on the second white ink layer.

7. The printing method according to claim 6, wherein the non-white ink comprises at least one member selected from the group consisting of a black ink, a cyan ink, a magenta ink, and a yellow ink.

8. A printing device, comprising:
   an ink accommodating chamber including:
   a first ink accommodating chamber accommodating a first white ink comprising a first white pigment; and
   a second ink accommodating chamber accommodating a second white ink comprising a second white pigment;
   a discharging device including a discharging head configured to discharge the first white ink and the second white ink,
   wherein the following relationship is satisfied:
   $|R_A - R_B| \geq 1.0$, where $R_A$ represents a refractive index of the first white pigment and $R_B$ represents a refractive index of the second white pigment.

9. Printed matter comprising:
   a substrate;
   a first white ink layer overlying the substrate, the first white ink layer being formed with a first white ink comprising a first white pigment; and
   a second white ink layer overlying the substrate, the second white ink layer being formed with a second white ink comprising a second white pigment,
   wherein the first white pigment comprises a hollow polymer particle or a hollow silica particle each of which has a refractive index of from 1.2 to 1.3,
   wherein the second white pigment comprises titanium oxide having a refractive index of from 2.30 to 2.75.

10. The printed matter according to claim 9, further comprising a third ink layer with a non-white ink.

11. The printed matter according to claim 10, wherein the first white ink layer is formed on the substrate, the second white ink layer is formed on the first white ink layer, and the third ink layer is formed on the second white ink layer.

12. The printed matter according to claim 9, wherein the substrate is a non-permeable substrate.

13. The printed matter of claim 9, wherein the following relationship is satisfied:

$|R_A - R_B| \geq 1.2$, where $R_A$ represents a refractive index of the first white pigment and $R_B$ represents a refractive index of the second white pigment.

14. The printing method of claim 1, wherein $|R_A - R_B| \geq 1.2$ is satisfied.

15. The printing device of claim 8, wherein $|R_A - R_B| \geq 1.2$ is satisfied.

* * * * *